United States Patent
Satterfield et al.

(10) Patent No.: US 7,542,993 B2
(45) Date of Patent: *Jun. 2, 2009

(54) SYSTEMS AND METHODS FOR NOTIFYING A CONSUMER OF CHANGES MADE TO A CREDIT REPORT

(75) Inventors: Markus Ray Satterfield, Alpharetta, GA (US); Jan Eileen Elliott-Sinnock, Berkeley Lake, GA (US); James David Lester, IV, Atlanta, GA (US); Christopher Colin Puckett Atwood, Cumming, GA (US); Stephen Ray Killebrew, Buford, GA (US)

(73) Assignee: Equifax, Inc., Atlanta, GA (US)

( * ) Notice: Subject to any disclaimer, the term of this patent is extended or adjusted under 35 U.S.C. 154(b) by 185 days.

This patent is subject to a terminal disclaimer.

(21) Appl. No.: 11/337,156

(22) Filed: Jan. 20, 2006

(65) Prior Publication Data

US 2006/0200396 A1    Sep. 7, 2006

Related U.S. Application Data

(63) Continuation-in-part of application No. 09/852,597, filed on May 10, 2001, now Pat. No. 7,028,052.

(51) Int. Cl.
*G06F 17/30* (2006.01)
*G06F 7/00* (2006.01)
*G06Q 10/00* (2006.01)
*G06Q 20/00* (2006.01)
*G06Q 40/00* (2006.01)

(52) U.S. Cl. .............. 707/104.1; 707/102; 705/30; 705/38; 705/44

(58) Field of Classification Search ............. 707/104.1, 707/102; 705/30, 38, 44
See application file for complete search history.

(56) References Cited

U.S. PATENT DOCUMENTS 6,006,206 A * 12/1999 Smith et al. ............... 705/35

(Continued)

FOREIGN PATENT DOCUMENTS

EP    1 028 401    8/2000

(Continued)

OTHER PUBLICATIONS

New Privista Product Provides Early Warning System to Combat Identity Theft ID Guard To Build Consumer Confidence, Save Companies In Lost Revenue (Oct. 23, 2000) file://C:\WINNT\Profiles\Iwang\Temporary%20Internet%20Files\OLK4E\privista%20-%20 (2 pages).

(Continued)

*Primary Examiner*—Kuen S Lu
(74) *Attorney, Agent, or Firm*—Kilpatrick Stockton LLP

(57) ABSTRACT

A system and method for monitoring unauthorized changes to a database and providing a notification to a user according to preferences set by the user. The user can select one or more data entries within a database to be monitored. When these data entries are changed, a notification is sent to the user. The user can also select a credit score or rating within the database to be monitored. When the credit rating changes, a notification can also be sent to the user. Notifications regarding interest rates, prices, and other financial information associated with a change in a credit score or rating can also be sent to the user according to preferences set by the user.

11 Claims, 16 Drawing Sheets

U.S. PATENT DOCUMENTS

| | | | |
|---|---|---|---|
| 6,029,149 | A | 2/2000 | Dykstra et al. |
| 6,055,570 | A | 4/2000 | Nielsen |
| 6,088,686 | A | 7/2000 | Walker et al. |
| 6,112,190 | A | 8/2000 | Fletcher et al. |
| 6,119,103 | A | 9/2000 | Basch et al. |
| 6,311,169 | B2 | 10/2001 | Duhon |
| 6,405,181 | B2 | 6/2002 | Lent et al. |
| 6,873,972 | B1 * | 3/2005 | Marcial et al. ............... 705/35 |
| 6,952,780 | B2 * | 10/2005 | Olsen et al. .................. 726/26 |
| 7,028,052 | B2 | 4/2006 | Chapman et al. |
| 2001/0011245 | A1 * | 8/2001 | Duhon ....................... 705/38 |
| 2002/0077964 | A1 * | 6/2002 | Brody et al. ................. 705/38 |
| 2002/0087460 | A1 | 7/2002 | Hornung |
| 2002/0116322 | A1 | 8/2002 | Schnall |
| 2002/0133462 | A1 * | 9/2002 | Shteyn ....................... 705/44 |
| 2002/0194143 | A1 | 12/2002 | Banerjee et al. |
| 2003/0041031 | A1 * | 2/2003 | Hedy ......................... 705/51 |
| 2005/0027892 | A1 | 2/2005 | McCabe et al. |

FOREIGN PATENT DOCUMENTS

| | | |
|---|---|---|
| WO | WO 99/49424 | 9/1999 |
| WO | WO 00/02150 | 1/2000 |

OTHER PUBLICATIONS

CreditCheck Monitoring Service—Why wonder what your credit report says? With the CreditCheck® Monitoring Service, you'll know! (Dec. 11, 2000) file://C:\WINNT\Profiles\Iwang\Temporary%20Internet%20Files\OLK4E\Credit%20check% (2 pages).

PrivacyGuard.com Set your records straight (Dec. 11, 2000) file://C:\WINNT\Profiles\Iwang\Temporary%20Internet%20Files\OLK4E\PrivacyGuard.htm (2 pages).

Experian Consumer Center (Dec. 11, 2000) file://C:\WINNT\Profiles\Iwang\Temporary%20Internet%20Files\OLK4E\Experian%20Con (1 page).

CreditAbility.com-Trans Union Online Credit Reporting and Monitoring Service (Dec. 11, 2000) http://www.creditability.com/ (1 page).

Index-Learn—No Waiting No Wondering No Doubts (Dec. 11, 2000) http://www.creditability.com/secondary/learn/iLearn.asp (3 pages).

Dennis, Sylvia, Soups Up ID Theft Monitoring Service, *Newsbytes*, Jan. 26, 2001 (one page).

About ID Guard web.archive.org/web/20011024051700/privista.com, Jan. 4, 2001 (02 pages).

Non-Final Office Action, U.S. Appl. No. 09/852,597, dated Oct. 27, 2003.

Final Office Action, U.S. Appl. No. 09/852,597, dated May 10, 2004.

Non-Final Office Action, U.S. Appl. No. 09/852,597, dated Feb. 11, 2005.

Notice of Allowability, U.S. Appl. No. 09/852,597, dated Oct. 25, 2005.

International Search Report and Written Opinion in related Application No. PCT/US2007/001222.

\* cited by examiner

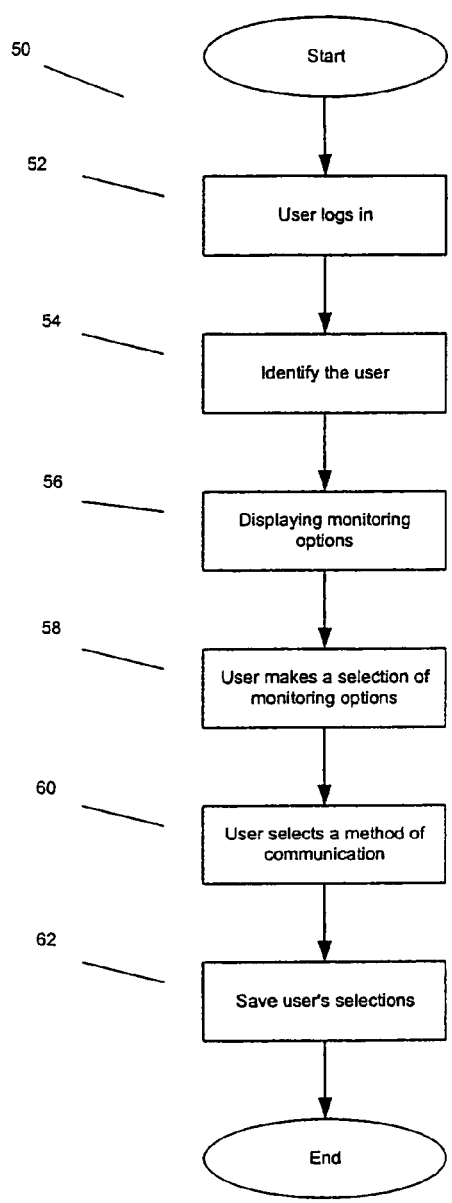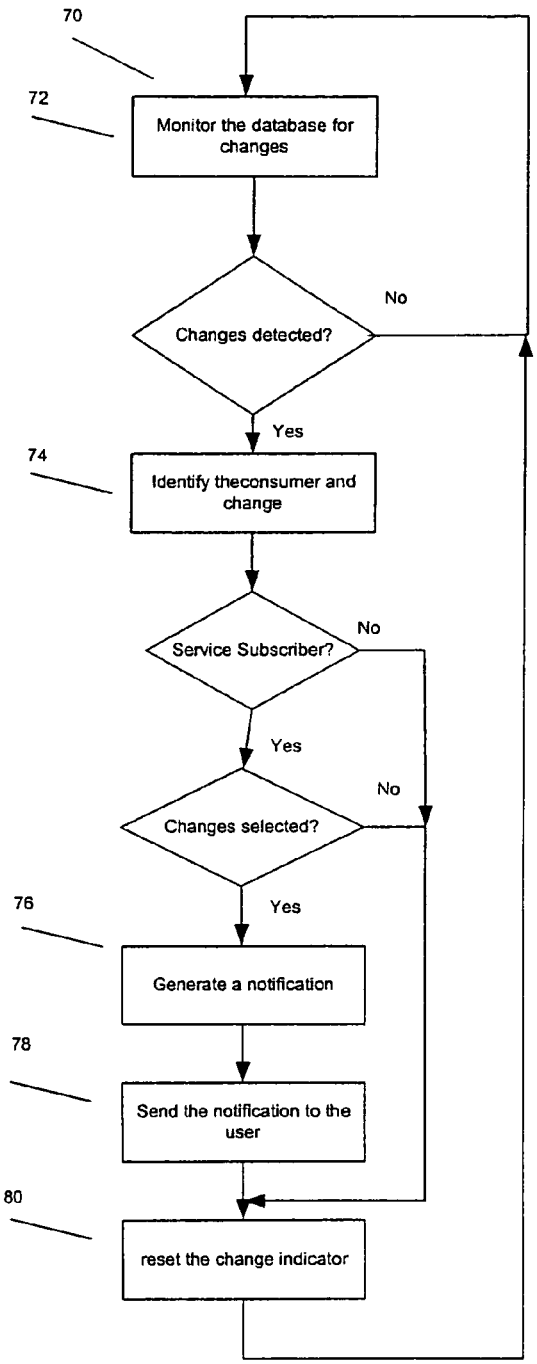
Fig. 3
Fig. 4

SYSTEMS AND METHODS FOR NOTIFYING A CONSUMER OF CHANGES MADE TO A CREDIT REPORT

RELATED APPLICATIONS

This application is a continuation-in-part of U.S. application Ser. No. 09/852,597, filed May 10, 2001, entitled "Systems and Methods for Notifying a Consumer of Changes Made to a Credit Report," and issued as U.S. Pat. No. 7,028, 052, the entire contents of which are hereby expressly incorporated by this reference.

FIELD OF THE INVENTION

The invention relates to systems and methods for monitoring changes to selected fields of a database. Particularly, the invention relates to systems and methods that monitor changes made to a database such as a credit report related database and notify a user or consumer when changes are made to a credit score stored in the database.

BACKGROUND OF THE INVENTION

The advent of technology advancement has made life easier for many people. Technology makes life easier for merchants by allowing them to transact a sale even when customers do not have sufficient cash for the purchase. The merchants offer credit card purchase backed by credit card issuing institutions who then own the receivable. The technology also makes it possible for consumers to make a purchase without ever visiting a store. Consumers can place their order from a web site or by telephone and pay with their credit cards. This new model in retailing relies heavily on technology and more importantly on the availability of credit information.

Having good credit is becoming an important factor in a person's life. A good credit rating is becoming a precious commodity in today's society. A person with good credit can apply for credit cards and make purchases without carrying cash. A person with good credit can obtain a mortgage loan easily and pay favorable interest rates. Society makes life easier and more affordable for people who have good credit.

In contrast, a person with less than perfect credit may be required to pay higher interest rates for a credit card. A person with bad credit may not be able to obtain a mortgage loan to purchase a house, and even if he is able to obtain a loan, it is likely that he will be required to pay a higher interest rate and to put down more money for the down payment. Bad credit may even prevent a person from obtaining the necessary loan to purchase an automobile for transportation purposes.

Although important to a person's life, a person's credit is affected by many factors. Credit is often impacted by one's action. Late mortgage payments and failure to repay student loans will damage one's credit. Credit may also be impacted by actions from third parties. Failure to record a car loan payment by a financial institution may lead the financial institution to report that the consumer is late in his payments. A retailer's mistake in reporting a failure for payment from someone with the same name may affect one's credit. Often a person does not learn about the damage to his credit until financial institutions turn down his application for credit, in which case he has to go through a painful process to clear mistakes and errors in order to restore his credit.

With such a strong impact on people's lives, more and more people are closely guarding their credit. More people want to know as soon as possible when their credit information changes for whatever reason, so they can take early action and not be caught by surprise.

However, recording and reporting errors and mistakes are not the only reason for changes in a person's credit rating. A new crime known as identity theft has caused problems for many people by damaging their credit rating. This new crime is the product of technology advancement. Technology now enables thieves to steal a person's identification information and usurps the person's identity without the person knowing it until the person's credit is damaged.

Thieves can steal information about a person through a variety of sources, such as a credit card receipt or an on-line database housed by merchants. Once a thief obtains some personal information on a person, the thief can impersonate this person in a variety of transactions. A thief can request a credit card based on the credit of that person and place purchase orders with no intention of ever paying for them. A thief may also change the address of a person in order to get more financial information about that person and do more damage to the credit rating of that person. In addition, all of this is done without the person ever knowing it or having a chance to stop it.

Often consumers only learn that someone has stolen their identities after the damage to their credit rating is done. The suspicions usually arise when a credit request is declined, or a loan application turned down, or worse when a collection letter is received.

To clear up their names and restore their credits, consumers need to report the crime to police, alert credit rating agencies, and essentially prove that they are not responsible for the delinquencies. This task can be frustrating and time consuming.

SUMMARY OF THE INVENTION

The present invention provides systems and methods for monitoring changes and modifications to a predetermined number of data elements in a database. Whenever a predetermined data element is changed or modified, the system provides a notification to a user whose watch list includes such data elements.

One embodiment of the present invention can comprise determining a credit score based in part on at least one or more data elements in a database, such as a credit reporting database. Whenever the credit score is changed or modified, the system can provide a notification to a user.

Another embodiment of the present invention can comprise monitoring one or more data elements in a database, such as a credit score in a credit reporting database. Data elements in a credit reporting database can comprise, among other data and types of data, a credit score. A user can select any number of data elements in a database, including a credit score, for monitoring. Whenever a preselected or predetermined data element is changed or modified, the system can provide a notification to a user that the data element, such as a credit score associated with the user, has changed. In another example, the system can provide a notification to a user whether the change impacts a credit score or not. If the credit score does change, the system can provide a notification to the user with at least one reason why the credit score changed.

A preferred embodiment of the present invention comprises a server functionally accessible from a network. The server functionally includes a database that stores data elements collected from several sources, and can also store a credit score based in part on at least one or more of the data elements. The server can also include a computer program that interfaces with users, monitors changes to the data elements and credit score, and sends notifications to the users. The database is generally a credit report database or repository, which contains data collected from or reported by different financial institutions, banks, and other credit bureaus. The database has a plurality of entries, and each entry may contain information about a particular consumer. Each entry may contain a consumer's identification information and other credit related data elements. Examples of the data elements can include, but are not limited to, current address, bankruptcy indicator, collections indicator, foreclosure indicator, a credit score, etc. In one embodiment, one or more data elements from any number of databases can be used to calculate or determine a credit score. For example, a credit score can be a relative ranking of a consumer's credit rating or risk to a particular entity such as a financial lending institution. The notifications can be sent in any number of ways, such as a posting to a secure webpage of a website, an e-mail to a user defined e-mail destination, a pager to the user's paging device, or a call to the user's telephone or wireless communication device.

The consumer can subscribe to the monitoring service in different ways, among them are through web site access or by contacting the service provider directly. During the subscribing procedure, the consumer provides his personal information such as social security number, driver's license number, etc. The service provider may employ a multi-stage authentication to further identify the subscriber. The service provider may ask the consumer to provide personal information generally not available to third parties. The service provider may ask the name of the mortgage company that holds the consumer's mortgage or the amount of monthly mortgage payments. When the consumer answers these questions correctly, he is properly identified. If the consumer fails to provide the correct answers, the service provider may still provide the monitoring service after the consumer supplies copies of a list of documents to the service provider for identification purposes.

After the consumer is identified, she is given an identification code and a user code. The consumer may then use this identification code and the user code to access the system to set up her monitoring criteria. She may be asked to select data elements, including her credit score, she wants to monitor and the manner in which to be notified. The consumer can select the data elements from all the data elements that made-up her credit file, and place these data elements into a watch list. In one embodiment of the present invention, the consumer may select one or more data elements including her credit score, and place these data elements and credit score into a watch list. In another embodiment, the consumer may select a data element, such as a particular interest rate for a loan or financial product the consumer is interested in qualifying for, and place these data elements into a watch list. In any instance, she can specify if she wants to be notified by e-mail, or by a telephone call among other possibilities. When an e-mail notification occurs, the user can visit the web site; alternatively, the information may be provided in the e-mail or telephone call itself.

The system receives information from a variety of sources and updates the database in a continuous manner. When a data element and/or credit score in the watch list is modified, the system generates a notification and sends it to the consumer who placed the data element and/or credit score in the watch list. When the consumer receives the notification, he logs into the system, presents his user and identification codes, and checks for the changes made to his credit file. If the change is unexpected or in error, then the consumer can be given the opportunity to request an investigation or place an alert to the system.

The investigation and the alert to the system can catch reporting mistakes or identity-stealing problems in an early stage, thus providing a chance for the consumer to take an active role to solve the problem while it has not caused extensive damage.

Pricing/billing can be implemented in any number of ways. It can be predicated on a per transaction basis, whether per email or call, minutes in a session on the website to learn the details of the change. It can be predicated on a flat or adjustable periodic charge based on value and/or number of fields being watched or monitored; more may be charged, for instance, to watch for certain field changes than others, or for changes to more fields than fewer.

BRIEF DESCRIPTION OF THE DRAWINGS

The foregoing and other aspects and advantages of the invention described herein will be better understood from the following detailed description of one or more preferred embodiments of the invention with reference to the drawings in which:

FIG. 3 is a flow chart for a user set-up process according to one embodiment of the present invention.

FIG. 4 is a flow chart for a system monitoring process according to one embodiment of the present invention.

DETAILED DESCRIPTION OF EMBODIMENTS

The terms user, customer, consumer, entity, and subscriber are used interchangeably in this application. Furthermore, the terms rating, credit rating, and credit score are used interchangeably in this application. Moreover, a data element in a database, such as a credit reporting database, can include, but is not limited to, a current address, bankruptcy indicator, collections indicator, foreclosure indicator, and a credit score.

Figure 1:
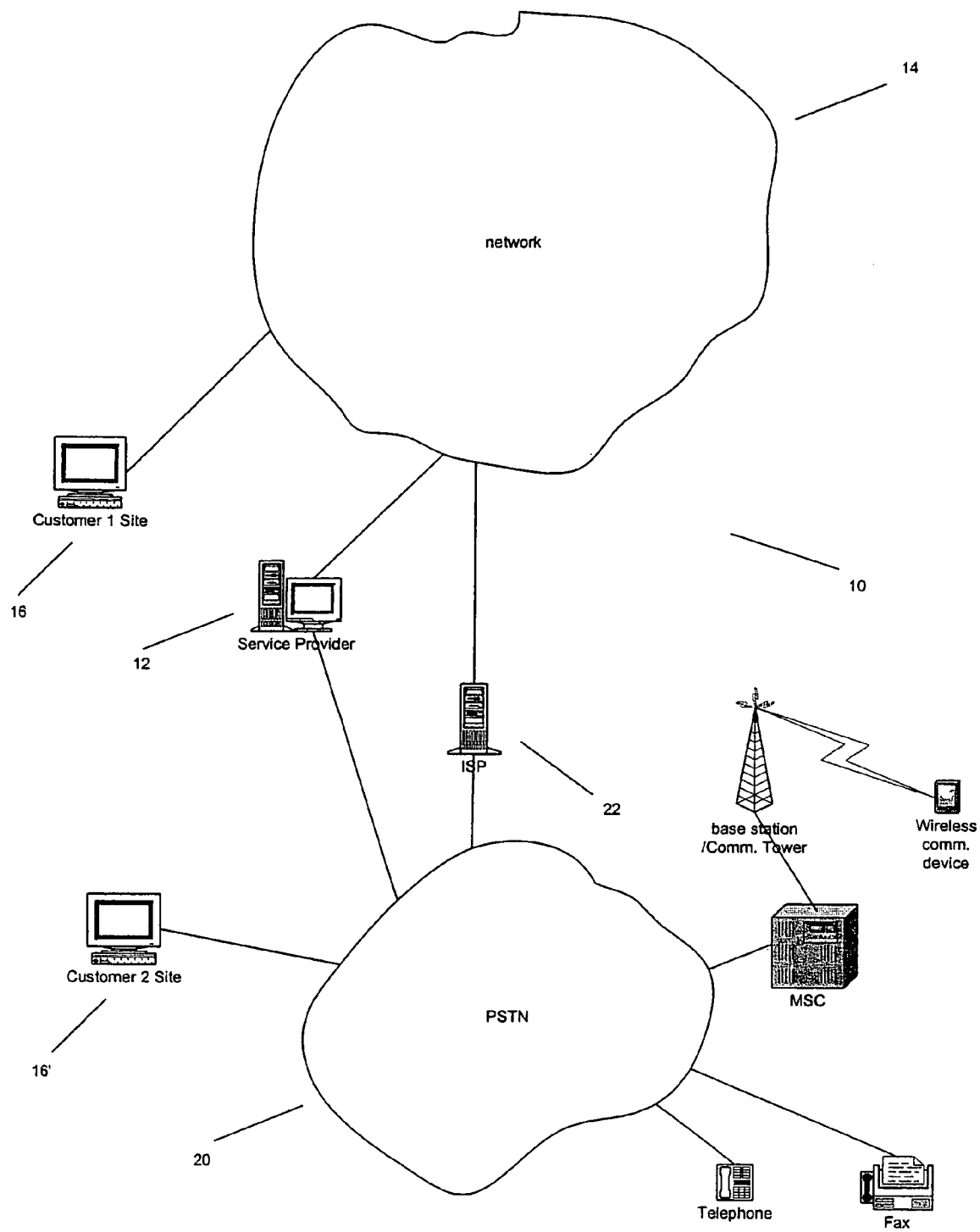
FIG. 1 depicts a system architecture according to one embodiment of the present invention.

Referring now in greater detail to the drawings, in which like numerals represent like components throughout several views, FIG. 1 depicts an architecture of a system 10 according to the present invention. The system 10 has a server 12 accessible through a network 14. The network 14 may be or include as a segment any one or more of, for instance, the Internet, an intranet, a LAN (Local Area Network), WAN (Wide Area Network) or MAN (Metropolitan Area Network), a frame relay connection, Advanced Intelligent Network (AIN) connection, a synchronous optical network (SONET) connection, a digital T1, T3, or E1 line, Digital Data Service (DDS) connection, DSL (Digital Subscriber Line) connection, an Ethernet connection, ISDN (Integrated Services Digital Network) line, a dial-up port such as a V.90, V.34 or V.34bis analog modem connection, a cable modem, an ATM (Asynchronous Transfer Mode) connection, FDDI (Fiber Distributed Data Networks) or CDDI (Cooper Distributed Data Interface) connections, WAP (Wireless Application Protocol), GPRS (General Packet Radio Service), GSM (Global System for Mobile Communication) or CDMA (Code Division Multiple Access) radio frequency links, RS-232 serial connections, IEEE-1394 (Firewire) connections, USB (Universal Serial Bus) connections or other wired or wireless, digital or analog interfaces or connections.

The server 12 provides a data change monitoring service to consumers 16 (customers). There are different ways for the customer 16 to reach the server 12 for service. Among the possibilities, a customer 16 may be connected directly to the network 14, the customer 16' may need to dial-up into an Internet Service Provider (ISP) 22 to access the network 14 and the server 12, the customer 16' may dial into a telephone network (PSTN) 20 to access the server 12 for service.

A server 12 has a database (shown in FIG. 2), which is a deposit of credit information collected from a variety of reporting sources. This credit information can be reported, for example, by a financial institution regarding delinquent loans, by a credit card company regarding late payments, or by a bank on address change for a particular customer. The server 12 may rate consumers that are listed in their database based on the credit information collected and provide this rating to other institutions who inquire the credit worthiness of a consumer. The server 12 is generally accessible via a network or through a dial-up access. A rating can be a credit rating or a credit score. A rating can be any relative measurement of the credit worthiness or credit risk associated with a user, entity, or consumer. A rating can be a number, a character, a series of numbers and/or characters, a measurement, or any combination thereof. A rating, credit rating, or credit score can be at least one multiple data elements in a database, such as a credit reporting database. In one embodiment, a rating can be a credit score based in part on at least credit information from one or more sources such as a credit reporting database. In another embodiment, a rating can be a credit score based in part on at least one or more data elements in a database such as a credit reporting database. Examples of a credit score or rating can include, but are not limited to, FICO® or Fair, Isaac score, or scores or ratings determined by financial institutions and credit reporting agencies such as Equifax, TransUnion, and Experian. Thus, the server and/or database 46 in FIG. 2 can include credit information such as credit data elements, credit-related data elements. The server and/or database 46 in FIG. 2 can also include credit score information such as credit score data elements, credit scores, credit ratings, and other credit score-related data.

The server 12 may also access or otherwise obtain financial information stored in any number of data storage devices or databases via the network 14. Financial information can include, but is not limited to, interest rates, name of a financial institution providing a loan, term of a loan, terms and conditions of a loan, financial information associated with the loan, name of a financial institution providing a financial instrument, term of a financial instrument, terms and conditions of a financial instrument, price of a financial instrument, and an interest rate for a financial instrument. Financial information can be associated with one or more financial products including, but not limited to, a home mortgage, auto loan, home equity loan, debt instrument, credit card, and a line of credit. The server 12 may, for example, obtain current interest rates for home mortgages from databases or websites associated with national and local lending institutions.

A customer 16 may access the server 12 in different ways. He can use a computer to access the server 12 through the network 14 and make a selection of data to watch by accessing a web site supported by the server 12. Alternatively, the customer 16' can also make a selection by making a telephone call to the server 12 and entering his selection through the keypad of the telephone. In yet another embodiment, the customer 16' can make a selection by accessing the server 12 through a wireless communication device.

The customer 16 receives a notification when a change has been made to his credit file, and he can receive this notification in a plurality of ways. He can receive an e-mail communication at his computer, receive a telephone call at his home or office, receive a fax, or receive a call on his wireless communication device.

In one embodiment, a customer 16 can receive a notification when a change has been made to his credit file, such as a credit rating, via a user interface facilitated by the server 12. An example of a user interface can be a web site with various information, including financial information, associated with one or more financial products. Such a web site can provide a user with different financial products to review and to choose from. In one example, a particular financial product can be offered at different rates, such as interest rates, depending on the user's credit rating. Different user notification settings can be offered to the user, or otherwise selected by the user, for each financial product depending on the particular financial product. For instance, if a user wanted to be notified when a change to his or her credit rating could affect a rate associated with a particular financial product, such as a home mortgage, then the user interface can facilitate obtaining the user's selections for a particular type of notification. For example, if a user desires a specific rate, such as 6.5%, for a particular home mortgage, the user can select via the user interface a particular notification setting to notify the user when his or her credit rating changes and affects the rate for the home mortgage the user may be interested in. When a change to the user's credit rating is received or otherwise detected, and the change affects a rate associated with the desired financial product, such as a home mortgage, then the server, such as 12, can provide a notification via the web site or other preselected type of user notification. In one embodiment, ranges or bands of credit scores with corresponding interest rates for a particular financial product can be determined. The ranges or bands of credit scores can be based at least in part on average credit scores for consumers who have obtained specific interest rates for the particular financial product. In another embodiment, a user can be notified when his or her credit rating changes or otherwise affects eligibility or qualification for a financial product. In this specification, the term "eligibility" means actual, predicted, or expected qualification for a particular financial product, wherein the qualification may be performed or otherwise facilitated by a third party associated with the financial product. For instance, when a change to the user's credit rating is received or otherwise detected, and the change is sufficient to qualify or affect eligibility of the user for the desired financial product, such as a home mortgage, then the server, such as 12, can provide a notification via the web site or other preselected type of user notification.

Figure 2:
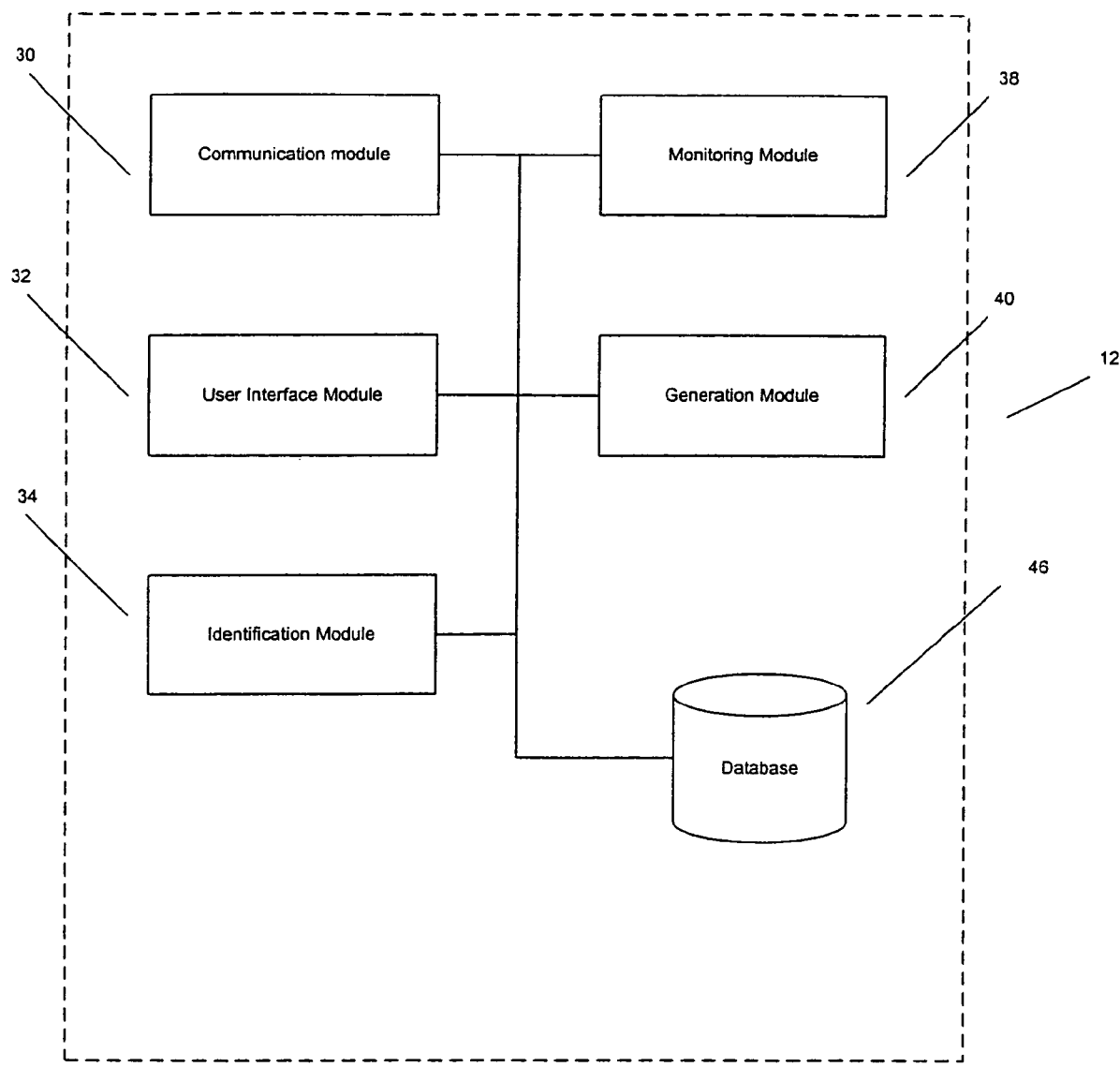
FIG. 2 depicts a software architecture according to one embodiment of the present invention.

FIG. 2 is a block diagram of software modules inside the server 12. The server 12 can include a processor and can include a memory on which one or more modules are stored. In one embodiment, the server 12 has a communication module 30, a user interface module 32, an identification module 34, a monitoring module 38, a generation module 40, and a database 46. The database 46 can include a computer-readable memory on which one or more computer programs are stored.

The user interface module 32 is responsible for interfacing with customers. The user interface module 32 is responsible for prompting customers for their identification information. The user interface module 32 is also responsible for handling the new customer sign-up process. In a preferred embodiment, a user must become a subscriber to access the monitoring service. During the signing-up procedure, the user interface module 32 asks personal information, such as the user's name, address, social security number, and driver license information from the user and assigns a customer code and an identification code to the user. In an alternate embodiment, the user interface module 32 may employ a multi-stage identification scheme, wherein the user interface module 32, besides prompting for the customary user information, asks for additional credit related personal information that would not normally be available to third parties. The credit related personal information may include, among other possibilities, the name of the mortgage company that provides a loan to the user, the amount of monthly mortgage payment, etc. The user's subscription is accepted only after the user is properly identified. After signing up for the monitoring service, the customer can set a criterion for data change and/or credit score monitoring.

The customer can set criteria for data and/or credit score monitoring. He can identify which changes to his credit file are to be monitored, how and when he is to be notified of any changes. For example, the customer may only desire monitoring of multiple credit report requests within a predetermined time. The customer may identify the monitoring and notifying criteria as three credit report requests within a thirty (30) day period. Therefore, if the server 12 detects that three credit report requests have been made within a thirty day period, the server 12 sends a notification to the customer.

In one embodiment, the customer can indicate criteria associated with a credit score to be monitored, including how and when he is to be notified of any changes to the credit score. For example, the customer may desire monitoring of any change to his credit score. The customer may identify monitoring and notifying criteria such as when the credit score reaches a selected score or rating. Therefore, if the server 12 detects that the customer's credit score drops to at least or below a particular score, for example 650, the server 12 can send a notification to the customer. In other embodiments, other values, measurements, or ranges for a credit score can be selected for monitoring. In further embodiments, other credit ratings, ratings, or measurements of credit worthiness can be selected for monitoring.

In another example, a customer may desire monitoring of changes to her credit score that may affect an interest or lending rate the customer could expect to receive in the marketplace. For example, if a customer's credit score changes to the extent that an interest rate for a home mortgage increases above, for instance 5.25%, the server 12 can send a notification to the customer. In this instance, the customer may identify monitoring and notifying criteria such as when changes in her credit score affect an interest rate, such as when a drop in the credit score increases the interest rate for a home mortgage loan of interest. In other embodiments, other values, measurements, or ranges for an interest rate can be selected for monitoring. Furthermore, in other embodiments, other financial products, loans, or financial instruments can be selected for monitoring.

The customer may also elect to monitor any reporting of late payments or missed payments from any financial institutions. The customer will then receive a notification whenever a bank reports a late payment for a loan or a department store reports a nonpayment on a credit card.

The customer may also elect to monitor changes to certain data elements in the database 46. The database 46 contains credit related information for each consumer. The database 46 has generally one entry per consumer. Each entry identifies a consumer by the consumer's name, social security number, or other unique information. Each entry has a plurality of data fields, and each data field stores a data element. Examples of the data fields are current address field, former address field, bankruptcy indicator field, etc. In one example, the customer may elect to monitor changes to account balances or date of last activity.

In one embodiment, the customer may elect to monitor changes to a credit score in the database 46. The database can also include at least one credit score, or a credit rating, for each consumer, entity, or customer. A credit score or credit rating can be determined by, or otherwise obtained from, one or more data sources.

The customer can input the monitoring criteria from a data input mechanism provided by the user interface module 32. The data input mechanism can be among other possibilities a data input screen displayed on a computer screen or on a personal digital assistant (PDA) screen, an audio response system through a telephone device, or other input means. The customer is also prompted for a selection of a method of communication that will be used to dispatch notifications when a data change is detected. The customer can choose among other possibilities to receive notifications via a posting to a webpage of a website, an e-mail, a telephone call to either customer's home, office, or wireless communication device, or a fax to customer's fax machine.

The user interface module 32 assigns a customer code and an identification code to the user after the user properly subscribed the monitoring service. In an alternate embodiment, the customer may be assigned one single identification code for accessing the server 12. The user supplies the customer code and the identification code when he accesses the server 12 to modify his data monitoring selection or to check data changes. The user interface module 32 displays a menu to the customers and receives selections from the customers.

The user interface module 32 is also responsible for displaying the changes to the customers. The customer 16 receives a notification about a data change and/or credit score change detected on his credit file and is invited to access the server 12 to check the changes. When he logs into the server 12, he supplies his customer code and his identification code. In an alternate embodiment, the server 12 may employ a multi-stage authentication process. In this multi-stage authentication process, the server 12 asks first the user's customer code and identification code, and the server 12 asks for additional personal information to further authenticate the user. After the customer is authenticated, the server 12 will display a menu from where he can make a selection to view the data changes and/or credit score change.

Notifications relating to data changes and/or credit score changes can be stored for subsequent retrieval in the server 12, associated database, or any suitable data storage device. In one embodiment, the user interface module 32 can provide an archive page of any current and prior notifications. An archive page can also include a trending of a user's credit score over a predetermined or selected period of time. When a customer selects a menu item to display archived data, the user interface module 32 can retrieve data associated with notifications relating to data changes and/or credit score changes stored in the server 12, associated database, or suitable data storage device. The user can then view the data on an associated display device.

The communication module 30 is responsible for handling communication between the server 12 and the customer 16. In a preferred embodiment, all communication between the server 12 and the customer 16 are transmitted in a secure manner. The communication module 30 encrypts all outgoing messages and decrypts incoming messages. The communication module 30 may communicate with the customer 16 by posting data on a webpage on a website, sending an e-mail, placing a telephone call, sending a facsimile, or sending a paging message.

The monitoring module 38 is responsible for monitoring the data stored in the database 46. The monitoring is a continuous process, and the database 46 continuously receives data compiled from outside sources. The database 46 has a plurality of entries, each entry has information on a particular person. Each entry has a number of data fields. When information, for example the current address, pertaining to a particular person has changed, a flag is set for this data entry indicating the change. The monitoring module 38 detects the flag and dispatches the identification module 34.

The identification module 34 is responsible for identifying the change and the customer 16. The identification module 34 checks the data entry to identify the customer 16 and the data field that has changed. The customer profile is retrieved for analysis. If the customer 16 has selected to monitor the data field that has changed, then the customer 16 will be notified about this change and the flag is reset. If the customer 16 did not select to monitor this data field, then the flag is reset and the customer will not receive a notification.

The generation module 40 is responsible for generating a notification to the customer 16. The notification indicates to the customer 16 that a change, such as a data element or credit score change, has been detected on his credit file. The notification may include information directing the consumer to, for example, a member center or a web site to obtain additional information. The notification may also include a telephone number, an e-mail address, a post office address, etc. that the customer 16 may use to obtain further information. The notification may further include a hypertext link to the service provider's website, and the customer 16 can click on this link to access the web site to obtain additional information. In an alternate embodiment, the generation module 40 may generate a notification that includes information on the data element or credit score change. The notification may list the data field that has changed and the new data itself. The notification may also list changes to the credit score, including the new credit score, changes to interest rates or qualifications for financial products affected by changes to a credit score. In a preferred embodiment, a notification with sensitive information, such as credit data and credit score, is transmitted through secure transmission media. In yet another alternate embodiment, the notification may include instructions on how a customer 16 may request an investigation, if the change seems to be unexpected or in error.

Notifications can include information to assist a user in understanding her credit score. For example, a notification can include a credit score summary such as a brief reason why a credit score changed. A notification can also include a summary or "bottom line" of what a score means, such as, "Your score is slightly below the average score of U.S. consumers, though most lenders consider this a good score." Other examples of a summary can include, but are not limited to, "You have a good score and a wide array of loans and credit products will be available to you.", "Most lenders will consider offering you very competitive rates and terms on loan products.", and "Some lenders may require additional information, such as income or time at job, to help them more accurately set the terms of your loan product."

In yet another example, a notification can provide any negative reason code changes. Negative reason codes are factors that can affect a credit score. Negative reason code changes can include, but are not limited to, "The amount owed on your accounts is too high.", "You have a relatively high number of accounts with balances.", and "The time since your most recent account opening is very recent."

The generation module 40 can also provide comparative type information for credit reporting or credit score data. In one example, a notification can provide a percentile ranking of a user's credit score relative to a population, such as a demographic or overall rank. For example, a notification can indicate that the particular user's credit score is in the top 15% of all credit scores. In another example, a graphical display of how lenders perceive your credit score can indicate a relative ranking of a user's credit worthiness compared to other users. The relative ranking can be associated with a particular financial entity, loan, financial product, or financial instrument. For example, three bar charts corresponding to three home mortgage lenders offering different home mortgage loans can be displayed with the relative rankings of the user's credit worthiness through the lenders' perspective.

In another example, a notification can include educational tips or suggestions. Educational tips or suggestions can be provided through a third-party source of information, such as a credit counseling organization, a credit scoring entity, credit reporting agency, or other financial institution.

As shown by the various examples above, the present invention can assist a user in understanding his credit score so the user can take corrective action if needed.

In one embodiment, a generation module 40 can also provide comparative type information for credit score data and financial information stored in any number of data storage devices or databases via the network 14. For example, a generation module 40 can facilitate display of a user interface, such as 1800 shown and described below with respect to FIG. 18, with a graph showing different ranges or bands of credit scores and interest rates for a 30 year home mortgage. The graph can show one or more changes in a user's credit score over a predetermined period of time, such as a six month period of time, and some or all of the changes in the credit score can correlate to a different interest rate for a mortgage or other financial product.

In another embodiment, a user can interact with a generation module 40 via a keyboard or other input device, and can select from a variety of financial products, such as a car or home equity loan, to monitor how changes in his or her credit score may affect the different interest rate for a particular financial product. A user may also select different notification settings for some or all of financial products, in the event that a change to his or her credit score affects his or her qualification or eligibility for a particular financial product. These and other examples are further explained with respect to FIG. 18 below.

FIG. 3 illustrates a process 50 for a user to set-up a monitoring process. A user accesses the credit monitoring service by logging into the server 12, step 52. The user is usually located remotely from the server 12 and accesses the service by dialing into the server 12 via a telephone connection or via the Internet. The user can use a computer or a plain telephone to access the server 12. The user supplies a user code and an identification code, which can be a personal identification number (PIN) or a password. Alternatively, the user may be asked to supply additional personal information during a multi-stage authentication process. The server 12 identifies the user as a subscriber to the service, step 54, and grants the access to the system.

After granting the access to the user, the system displays a menu to the user, step 56. For example, the menu can display a list of indicators that a user can choose to monitor individually or as a group. This list of indicators may include, for example, current address, former address, second former address, bankruptcy, collections, legal items, foreclosures, tax lien, garnishment, trade lines, and inquiries. These indicators represent data collected from a variety of sources and are normally included in a person's credit file. Other data from a person's credit file may also be included in this list of indicators.

The menu can also display indicators for a credit score and criteria associated with the credit score. For example, the menu can display a list of credit score indicators that a user can choose to monitor individually or as a group. This list of credit score indicators and associated criteria may include, for example, a target credit score, a band or range of credit scores, types of financial products or instruments which can be affected by changes in a credit score, and interest rates or prices associated with the financial products or instruments. For example, a credit score indicator can represent preselected ranges of credit scores for monitoring by the system. Other data from a person's credit file may also be included in the list of indicators or associated criteria.

The menu is preferably displayed on a computer screen or on a personal digital assistant screen at the user destination. In an alternate embodiment, the menu may be an audio menu played to the user's telephone.

The user selects from this menu the indicators he wants to monitor, step 58. The user can select one or more indicators to be monitored. The user can also set a condition under which he is to be notified when a change occurs to an indicator selected for monitoring. The user can choose to be notified, when a trade line has been open or closed, or when multiple credit reports have been requested within one month or another predetermined period of time. The user can also choose to be notified, when the credit score reaches a selected score or rating, or when changes to the credit score may affect an interest or lending rate, or price, the customer could expect to receive for a desired financial product or instrument in the marketplace.

The user also selects a preferred method of communication for receiving a notification, step 60. The user can specify how he wants to receive a notification. He can choose to receive via a posting to a webpage on a website, an e-mail sent to his e-mail address, a telephone call to his office or home, a fax to his fax machine, a paging message to his pager, his personal digital assistant (PDA) device, or a regular mail sent to his home or office. The notification may contain instructions to the customer on how to access the server 12 to obtain further information. In an alternate embodiment, the notification may contain information about the data or credit score change and instructions on how to contact the server 12 to initiate an investigation if the change is unexpected or in error.

The server 12 saves the user's selections and settings, step 62. The user can repeat the above procedure to change and modify his settings and selections.

FIG. 4 depicts a monitoring process 70 on the server 12. The monitoring process 70 is a continuous process that monitors the database changes, step 72. When an entry in the database changes, a flag is set to indicate the change. When a change is detected, the system checks the entry and identifies the user and the changes, step 74. The system also checks a subscriber database to see whether the user has subscribed to the monitoring service. If the entry belongs to a subscriber, the system checks the subscriber's profile if the subscriber (customer) has elected to monitor these changes. If the customer has elected to monitor these changes, then a notification is generated, step 76. The notification can be a simple message inviting the customer to access the system to get further information. In an alternate embodiment, the notification may also contain more detail information about the changes detected as well as instructions on how to access the system.

The system then dispatches the notification to the customer according to the method specified in the customer's preference, step 78. After sending the notification, the system resets the change indicator, step 80, and resumes the monitoring, step 72.

If after checking the data entry, the system detects the user is not a subscriber of the service or the customer has not elected to monitor these particular changes, the system can reset the change indicator, step 80, and resumes the monitoring, step 72.

In one preferred embodiment, the monitoring step 72 is implemented as follows. A change monitoring process, also known as delta process, monitors the following eleven fields: current address CA, former address FA, second former address F2, bankruptcy BA, collection CO, legal items LI, foreclosure FO, tax liens TL, garnishment GN, trade lines PT, and inquiries IQ. When a change, or a delta, is detected, the delta is stored in three tables:

Sentinel_delta_files—table used to store delta report segments

Sentinel_delta_segments—table used to store the before and after segments for which the delta was detected.

Sentinel_delta_fields—table used to store information identifying which fields in the compared segments were different.

The changes for each field are detected as follows.

CA—Current Address:

The 'newness' criteria for the current address segment is that there is no CA in the previous FFF but there is one in the current FFF. Current address segment changes are identified by comparing the address reported date field.

FA—Former Address:

The 'newness' criteria for the former address segment is that there is no FA in the previous FFF but there is one in the current FFF. Former address segment changes are identified by comparing the address reported date field.

F2—second former Address:

The 'newness' criteria for the second former address segment is that there is no F2 in the previous FFF but there is one in the current FFF. Second former address segment changes are identified by comparing the address reported date field.

BP—Bankruptcy:

New bankruptcy segments are identified by comparing the following fields:

1. date filed
2. case number
3. court number 4. how filed
5. legal type

If no matches are found in these fields while comparing a BP segment from the current FFF against all of the BP segments from the previous FFF, then the current BP segment is flagged and reported as new.

If matching BP segments are found, the following fields of the two segments (one from the current FFF and the other from the previous FFF) are compared. If found to vary, the current FFF BP segment will be flagged and reported as changed:
1. bankruptcy disposition CO—Collections:
New collections segments are identified by comparing the following fields:
1. date assigned
2. account number
3. member number
4. client name If no matches are found in these fields while comparing a CO segment from the current FFF against all of the CO segments from the previous FFF, then the current CO segment is flagged and reported as new.

If matching CO segments are found, the following fields of the two segments (one from the current FFF and the other from the previous FFF) are compared. If found to vary, the current FFF CO segment will be flagged and reported as changed:
1. collection status LI—Legal Items:
New legal items segments are identified by comparing the following fields:
1. date filed
2. case number
3. court number
4. plaintiff
5. defendant If no matches are found in these fields while comparing a LI segment from the current FFF against all of the LI segments from the previous FFF, then the current LI segment is flagged and reported as new.

If matching LI segments are found, the following fields of the two segments (one from the current FFF and the other from the previous FFF) are compared. If found to vary, the current FFF LI segment will be flagged and reported as changed:
1. legal item status
2. satisfied date FO—Foreclosure:
The FO comparisons vary from those performed for the other public item segments in that only new foreclosures are checked for and reported. The fields used during the comparison process to determine whether an FO segment is new are:
1. date reported
2. member number TL—Tax Lien:
New tax lien segments are identified by comparing the following fields:
1. date filed
2. case number
3. court number
4. creditor class If no matches are found in these fields while comparing a TL segment from the current FFF against all of the TL segments from the previous FFF, then the current TL segment is flagged and reported as new.

If matching TL segments are found, the following fields of the two segments (one from the current FFF and the other from the previous FFF) are compared. If found to vary, the current FFF TL segment will be flagged and reported as changed:
1. release date GN—Garnishment:
New garnishment segments are identified by comparing the following fields:
1. date filed
2. case number
3. court number
4. plaintiff
5. garnishee
6. defendant If no matches are found in these fields while comparing a GN segment from the current FFF against all of the GN segments from the previous FFF, then the current GN segment is flagged and reported as new.

If matching GN segments are found, the following fields of the two segments (one from the current FFF and the other from the previous FFF) are compared. If found to vary, the current FFF GN segment will be flagged and reported as changed:
1. satisfied date PT—Trade Lines:
New trade lines segments are identified by comparing the following fields:
1. date opened
2. account type (revolving, installment, etc)
3. account designator (joint or individual)
4. account number
5. company name
6. member number If no matches are found in these fields while comparing a PT segment from the current FFF against all of the PT segments from the previous FFF, then the current PT segment is flagged and reported as new.

If matching PT segments are found, the following fields of the two segments (one from the current FFF and the other from the previous FFF) are compared. If found to vary, the current FFF PT segment will be flagged and reported as changed:
1. narrative code 1
2. narrative code 2
3. rate code
4. previous rate 1
5. previous rate 2
6. previous rate 3

IQ—Inquiries:
New inquiry segments are identified by comparing the following fields:
1. member number
2. member name
3. inquiry date IQ segment changes are not possible and so are not checked.

In another embodiment, a change monitoring process, or delta process, can monitor an additional field for a credit score or credit rating. When a change, or a delta, is detected, the delta can stored in a corresponding table. A credit score or credit rating change can be detected by comparing existing data in an initial field with data in another field. If found to vary, the initial field can be flagged, and reported as changed.

Figure 5:
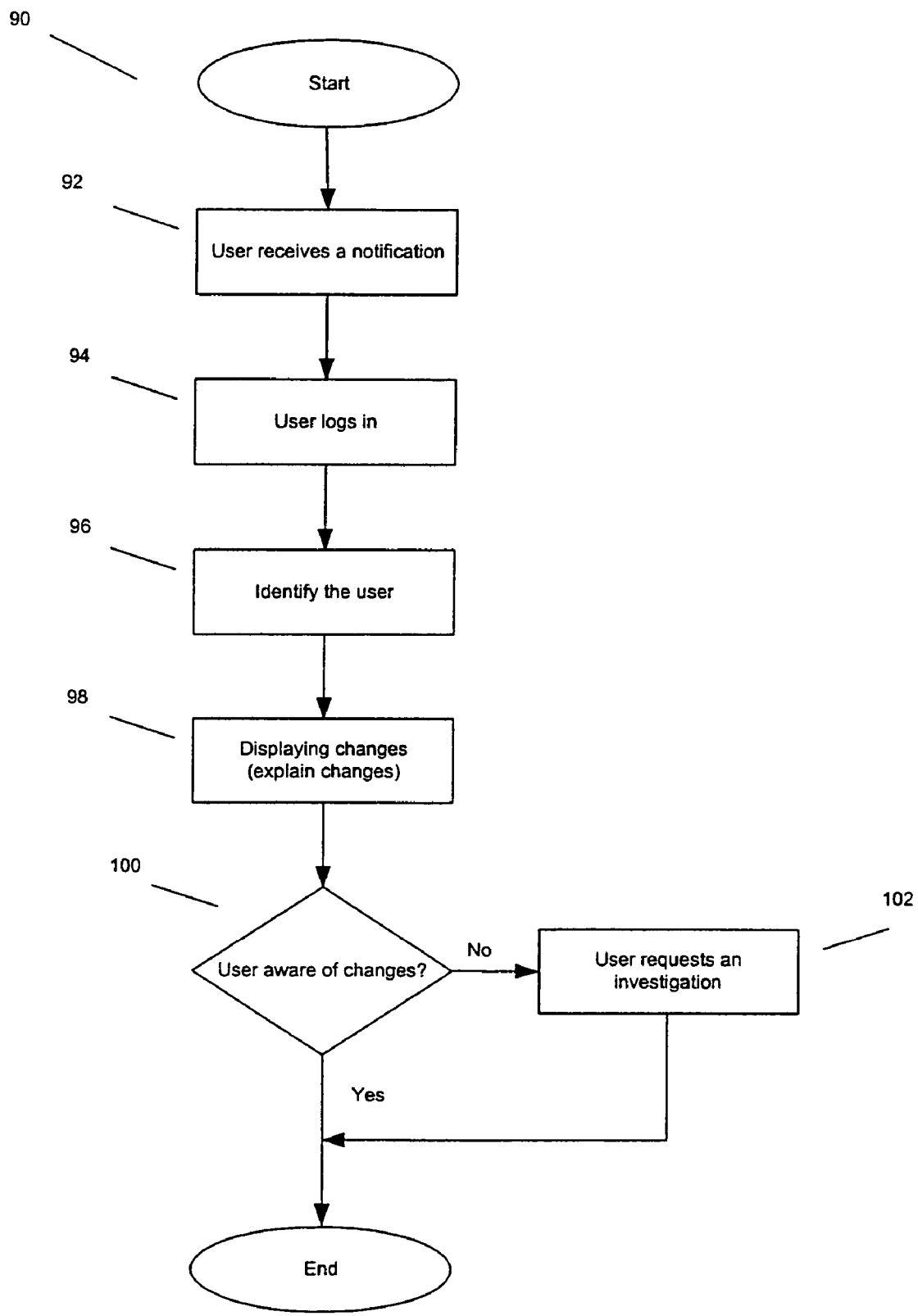
FIG. 5 is a flow chart for a user checking process according to one embodiment of the present invention.

FIG. 5 depicts a process 90 for a customer to check the changes. When a user receives a notification, step 92, he may be given specific instructions on how to access the system to verify the changes detected on his credit file, or he may just follow an established procedure to access his credit file. Generally, the user logs into the system, step 94, and provides his user code and identification code. The system checks the user code and the identification code and identifies the user as a subscriber, step 96. The system then displays a menu from which the user can choose to view changes to his credit file, step 98.

In an alternate embodiment, the server 12 may ask some personal information contained in the user's credit profile and use this information to authenticate the user.

In yet another alternate embodiment, the user may be given a special code in the notification, and the user can supply this code to the system upon logging in. The system will display directly the information about the changes.

If the changes are unexpected or in error, the user can request that an investigation be started, step 102.

The present invention is especially useful to consumers who want to protect their credit rating or credit score and to take an active role in policing changes to their credit files. A credit-reporting bureau or other entities that have access to a credit report repository may offer a credit watch service according to the present invention. Generally, a user needs to subscribe to a credit watch service with a service provider. After subscribing to the service, the user/subscriber can then specify what data he wants to monitor and how he wants to be notified.

The user can choose to monitor any adverse reporting to his credit file, i.e., a decrease to a credit score or credit rating, or any reporting of late payments or nonpayments by any reporting institution, such as banks, retailers, etc. The user can also choose to be notified by an e-mail message sent to his PDA. The user's selections are stored in the user profile.

When a bank holding a loan to the user reports a late payment on the user's account to the credit-reporting bureau, either because the payment was received beyond the grace period or because of the bank's operational mistakes, the credit-reporting bureau will accept the reporting and update the user's credit file to reflect the late payment. The credit-reporting bureau will also flag that there is a change to the user's credit file.

The credit watch service is notified about the changes in the credit database, and the service will analyze the change. After analyzing the change and realizing that the change is to a monitored data in the user's profile, the credit watch service through its software sends out an e-mail message to the user's PDA.

Changes in the credit database can affect a credit score associated with a consumer or user. If one or more changes affect a credit score, and the credit score is monitored data in the user's profile, the credit watch service can send an e-mail message to the user's PDA, or post a change to a webpage on a website. In one embodiment, a change to a credit score can affect qualification, an interest rate, or a price for a financial product or instrument. The credit watch service can also send an e-mail message to the user's PDA, or post a change to a webpage on a website to notify the user of the effect to the qualification, an interest rate, or a price for a financial product or instrument.

When the user receives an e-mail notification at his PDA, the user learns about a change to his credit file and/or credit score and the user is also given directions on how to access the system to verify the change. The user may use his PDA to login into the system remotely. The user provides his subscriber code and identification code to gain the access to the system. After the system validates the user, the system displays the change to the user.

If the user disagrees with the reporting of the late payment by the bank because he is not late with a payment, the user is given the option to file a challenge to the reporting with the credit-reporting bureau. This challenge is then handled by the system. The system may require the bank to verify the reporting or to provide some written explanation to the user. If the challenge is successful, i.e., the bank cannot produce proof of any late payments, then the adverse reporting is removed from the user credit file. If the challenge is not successful, the adverse reporting stays in the user's credit file.

The present invention is also helpful to consumers who want to stop someone from stealing their identity at an early stage. Generally, when a thief steals a person's identity (i.e., assumes this person's credit identity), the thief tends to open new credit accounts with false addresses or overcharges the existing credit accounts. The opening of new credit accounts can be detected by monitoring credit-check requests. A creditor usually checks the credit of a credit account applicant before granting the credit. By monitoring credit-check requests, the user (customer) can be notified when there is a new credit-check request.

The user can be notified when a credit check is performed on his credit information. The user then accesses the system and obtains the information on the entity that requested the credit check. If the entity is unknown to him or the reason for the credit check is not readily apparent to him, he can contact this entity for further inquiry as to the reason for such a credit check. If the credit check is done because someone applied for credit using his name, the user can then place a warning on his credit file, so other financial institutions can take precaution when dealing with people claiming to be this user. With help of the present invention, the user may be able to detect and to stop someone from stealing his credit identity.

The present invention can be marketed to consumers with different pricing options. The consumers must become a subscriber to receive notifications about changes to his credit profile. The subscription can be annually or monthly. The subscription price may be dependent on the number of data fields monitored, i.e., if a subscriber choose to monitor all data fields in his credit profile, he will pay more than another subscriber who chooses only to monitor fewer selected data fields. The means of notification that a subscriber chooses may also affect the subscription price. If the subscriber chooses to be notified by fax, he may have to pay more than if he chooses to be notified by e-mail. If the consumer chooses to receive notification in more than one place, he would pay more than what he would pay if he receives notifications in one place only.

There are different ways to implement the present invention and FIGS. 7-14 depict at least three embodiments and their respective internal processes.

Figure 6:
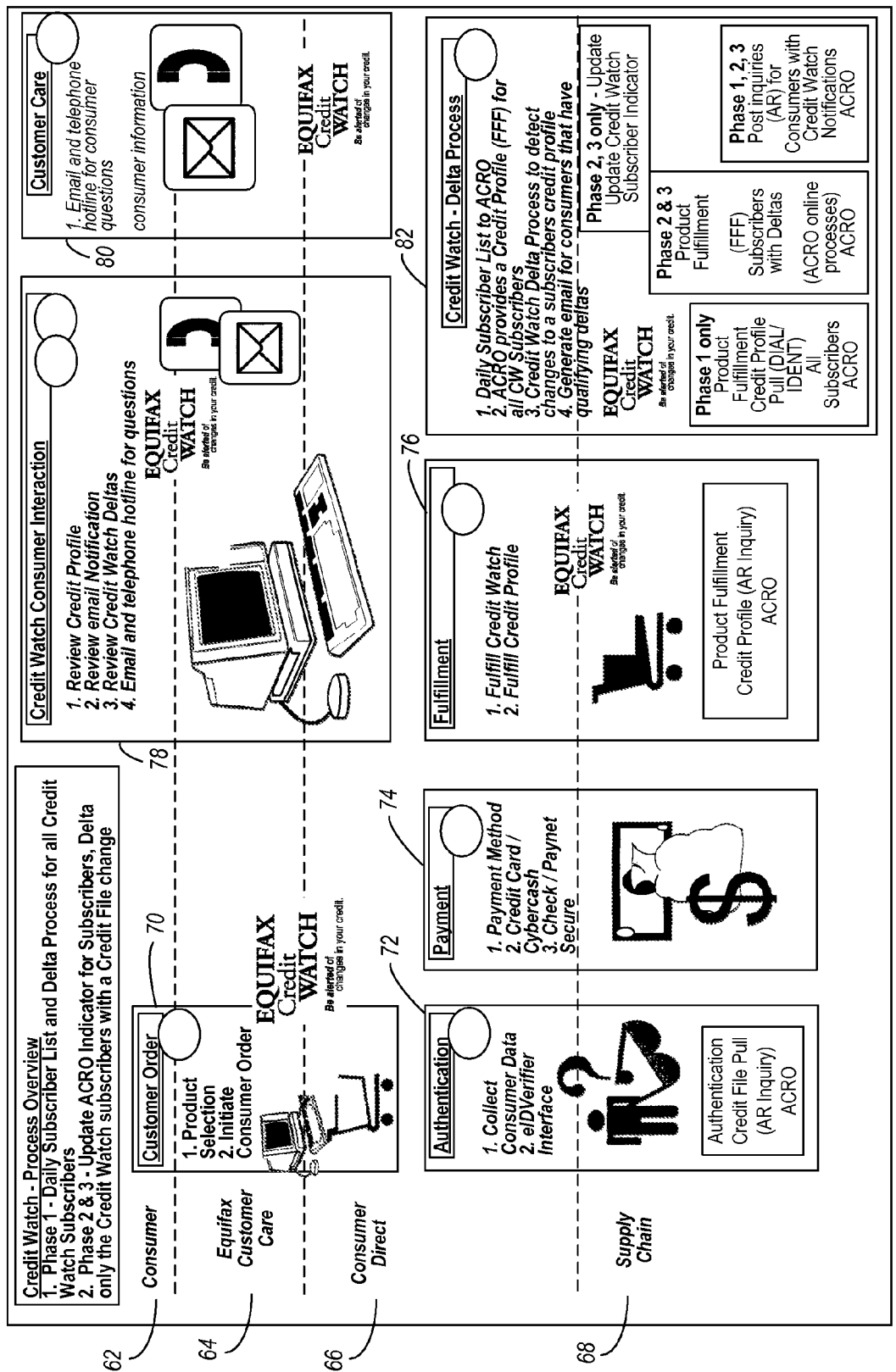
FIG. 6 is an overview of an embodiment of the monitoring process.

FIG. 6 is an overview of one embodiment of the monitoring process according to the present invention. The monitoring process involves several actors: consumer 62, customer care 64, consumer direct 66, and supply chain 68. Each actor may be a physical person, a team of experts, a software system, or an outside vendor. Customer care 64 is generally the customer support team. Consumer direct 66 is generally software elements of the system. Supply chain 68 may be internal or external support system, which can be external suppliers or internal identification systems. The credit modification monitoring service involves separate sub-tasks: customer ordering service 70, customer authentication service 72, payment service 74, fulfillment service 76, consumer interaction 78, customer care service 80, and delta process 82. Each of these sub-tasks may involve more than one actor.

Customer ordering service 70 allows a consumer to select what he wants to monitor and initiates an order for the monitoring service. Authentication service 72 collects the consumer data that identifies the consumer. Payment service 74 allows the consumer to select payment methods. Fulfillment process 76 finalizes consumer's service requests for monitoring services. Consumer interaction 78 is responsible for reviewing consumer's monitoring request, which includes reviewing consumer's credit profile, notification method, and monitoring delta. Consumer interaction 78 also provides e-mail and telephone support for monitoring services. Customer care 80 provides general customer support to the system. Delta Process 82 is responsible for detecting changes to a subscriber's credit profile.

Figure 7:
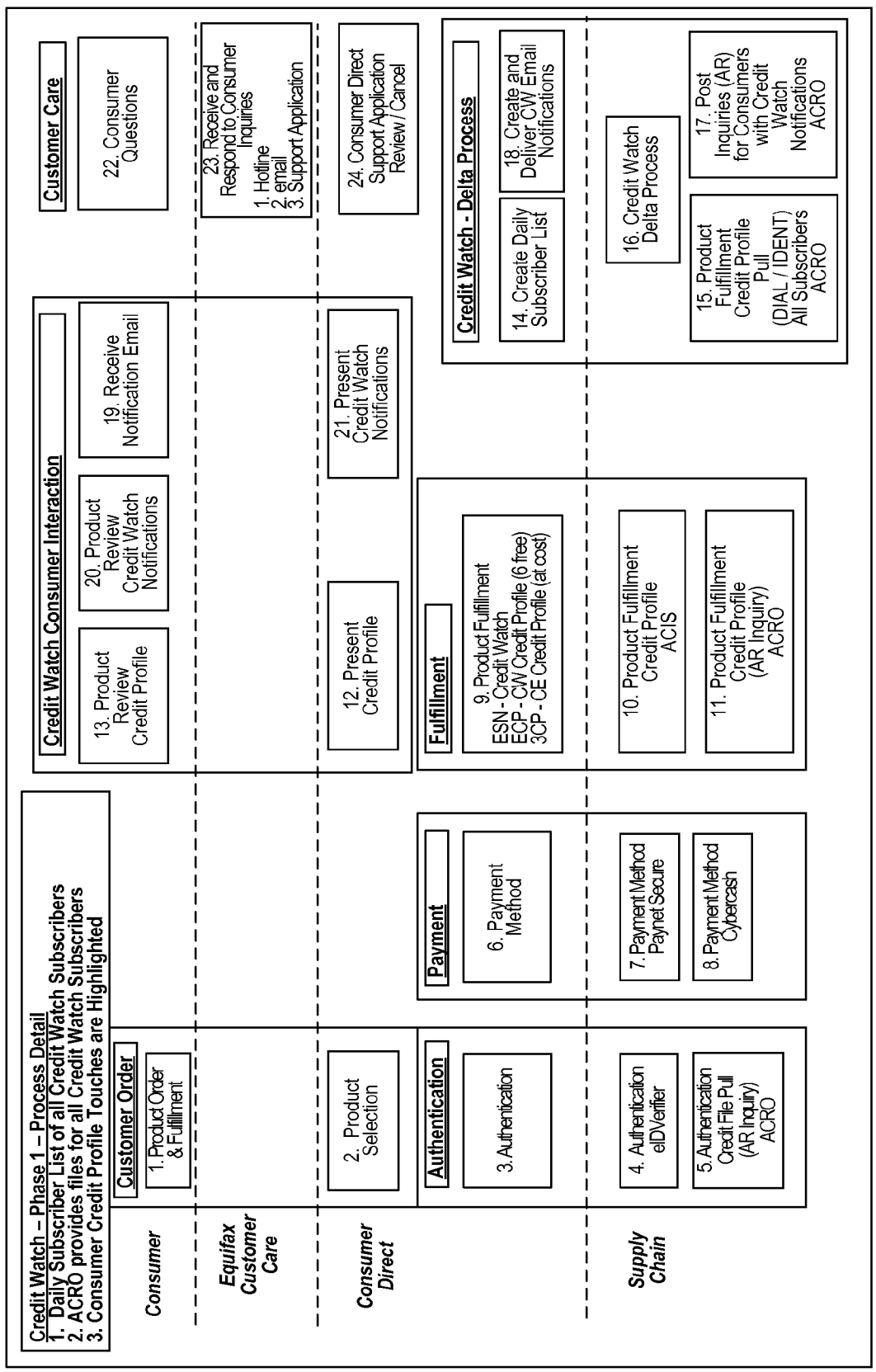
FIGS. 7-9 illustrate an alternate embodiment and interactions between processes and their details for this alternate embodiment.
Figure 8:
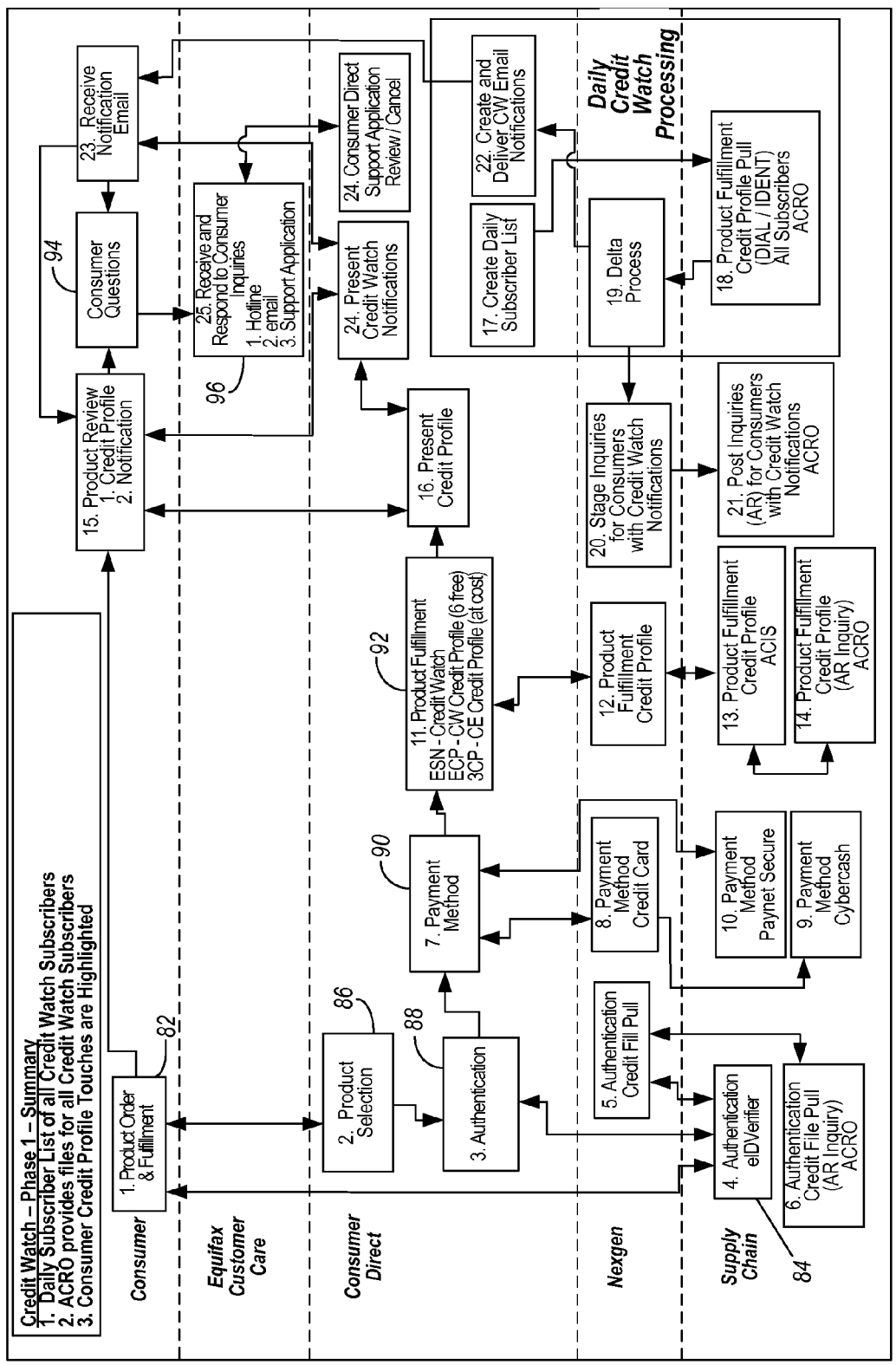
Figure 9:
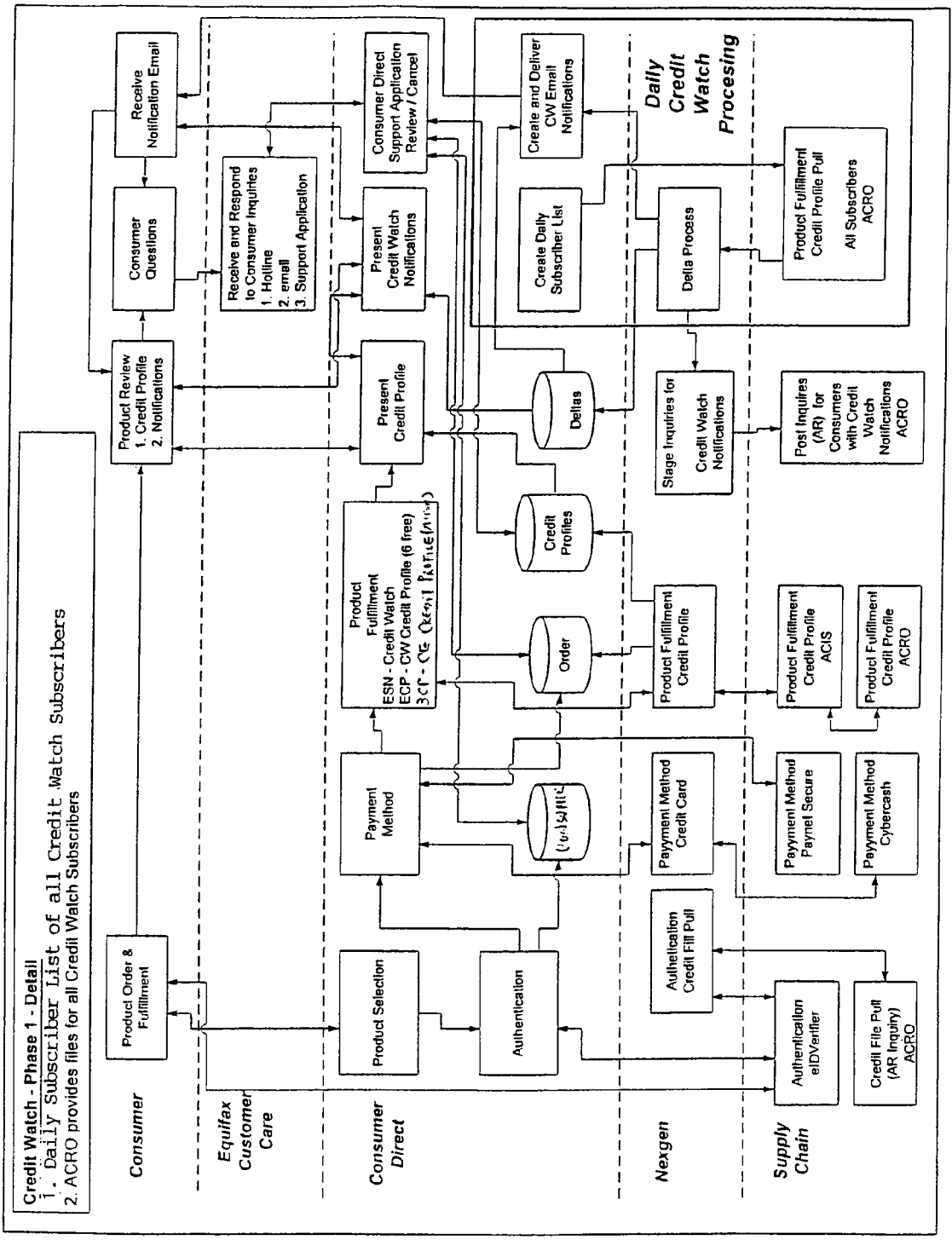

FIG. 7 depicts an alternate embodiment of the present invention, and FIG. 8 illustrates the interactions between different processes carried out by different actors in this alternate embodiment. FIG. 9 illustrates the interactions between the processes of FIG. 8 and different databases. Referring to FIG. 8, a consumer places an order through a product order and fulfillment process 82, and an authentication process 84 identifies the consumer before his order is processed. The consumer places his selection and payment information through a product selection process 86. The selection and payment information pass through an authentication process 88. A payment method process 90 handles the payment information with help from third party actors. A product fulfillment process 92 produces the credit information that the consumer has ordered. The credit information may be produced based upon information provided by third parties. The consumer can log into the system and review his credit profile. He can pose questions to a consumer questions process 94, which will provide answers with help from a process 96 supported by Customer Care. The consumer may receive answers to his questions through e-mails, telephone calls, or other suitable means. One skilled in the art can readily appreciate other features of this embodiment from FIGS. 7-9.

Figure 10:
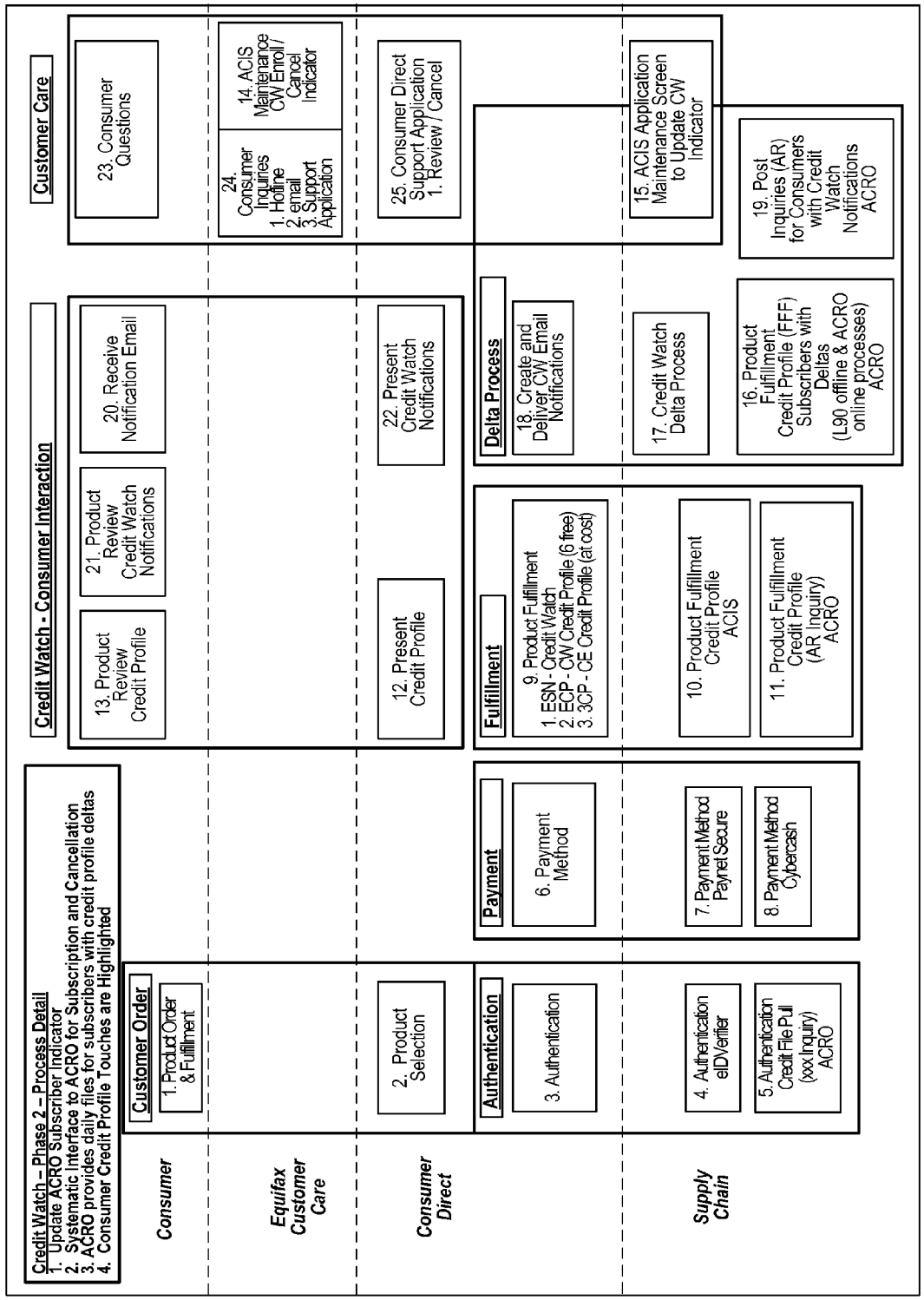
FIGS. 10-12 illustrate yet another embodiment and interactions between processes and their details for this embodiment.
Figure 11:
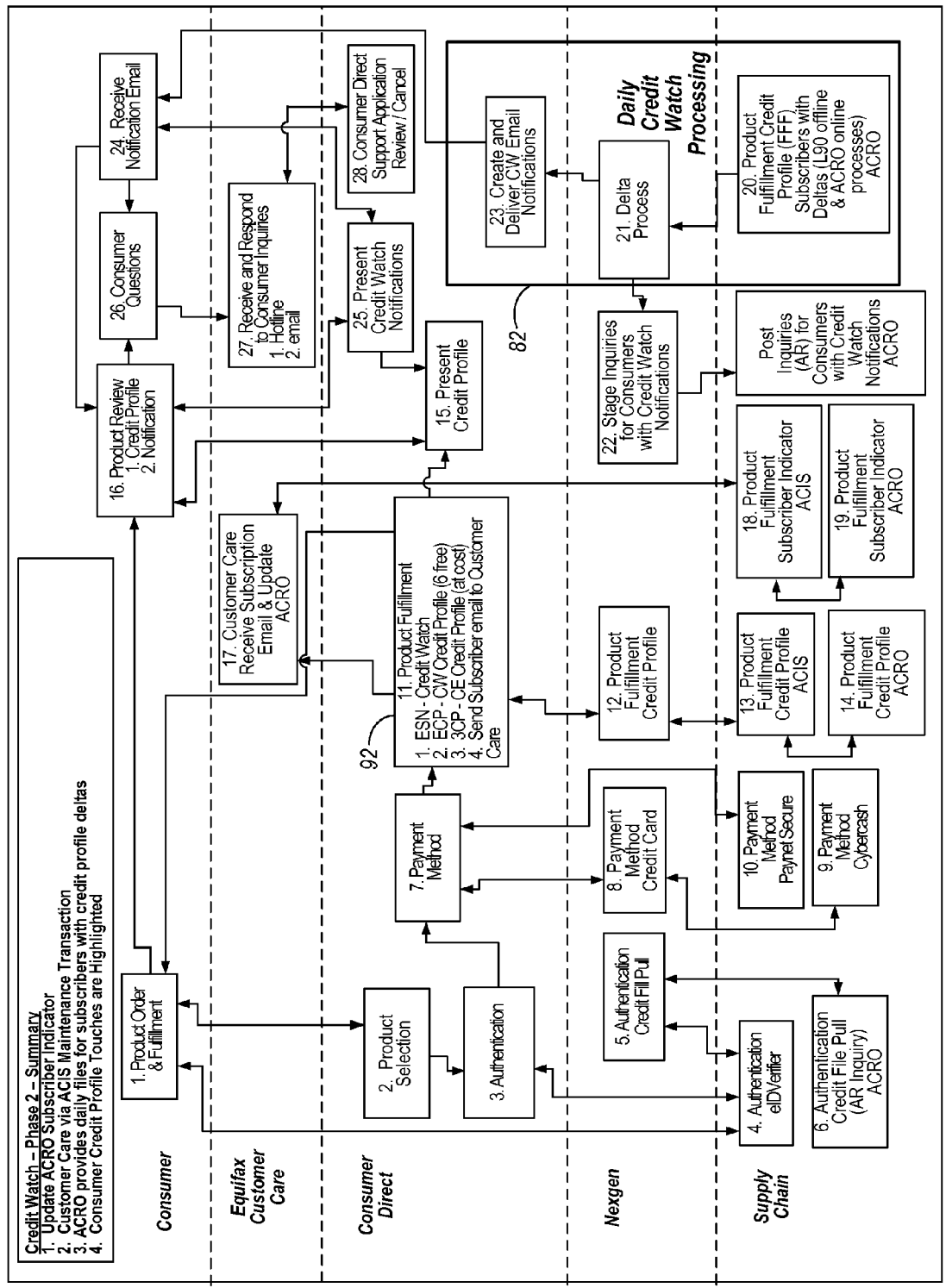
Figure 12:
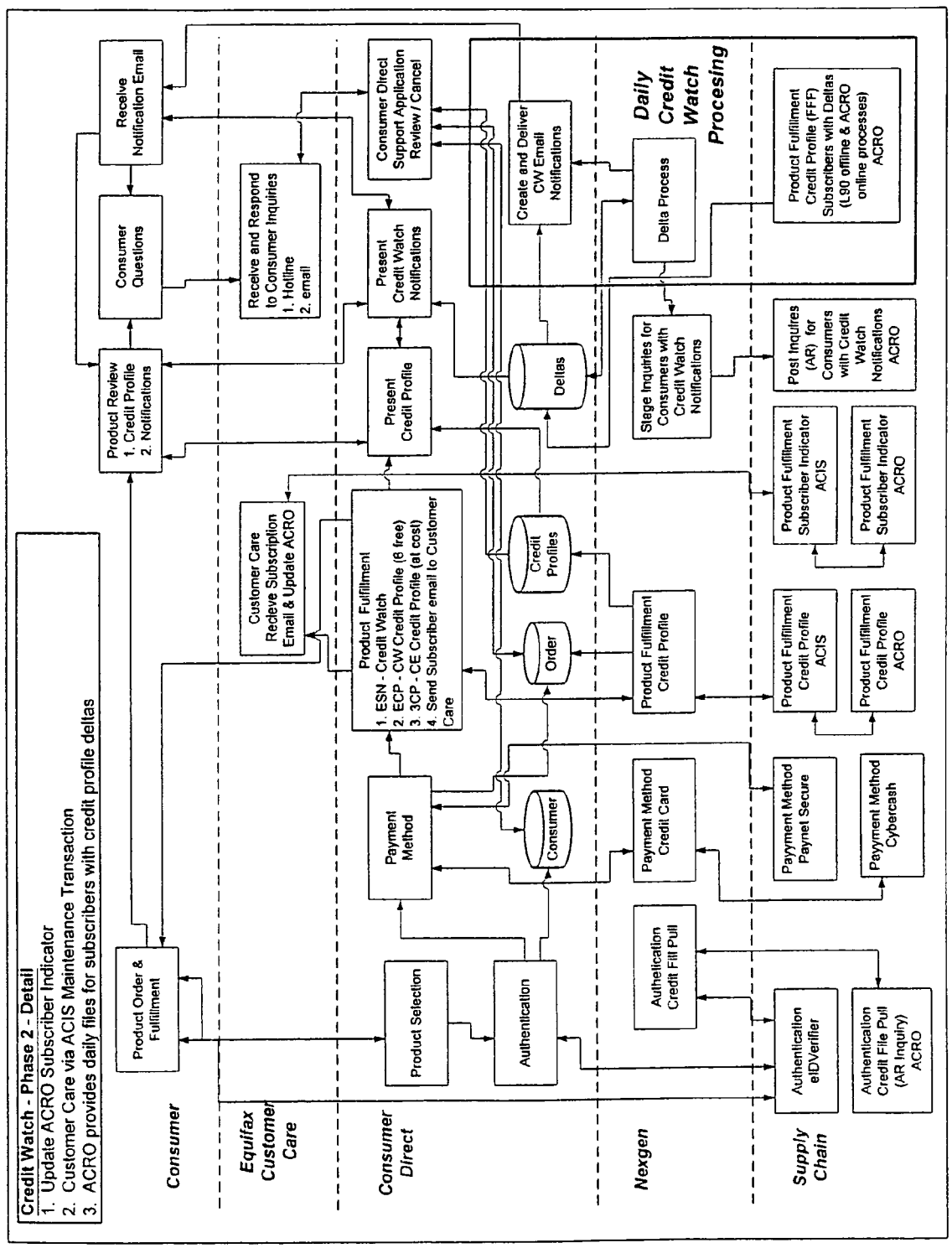

FIGS. 10-12 illustrate respectively yet another embodiment, the interactions between processes for that embodiment, and the interactions between the processes and one set of databases. In this embodiment, Customer Care receives e-mail notification about the product subscription from the Product Fulfillment process 92 and updates a credit reporting online system (ACRO). In this embodiment, the delta process 82 does not generate daily credit information for all subscribers. Instead, the delta process 82 only generates credit information for those subscribers whose credit information has changed. One skilled in the art can readily appreciate other features of this embodiment from FIGS. 10-12.

Figure 13:
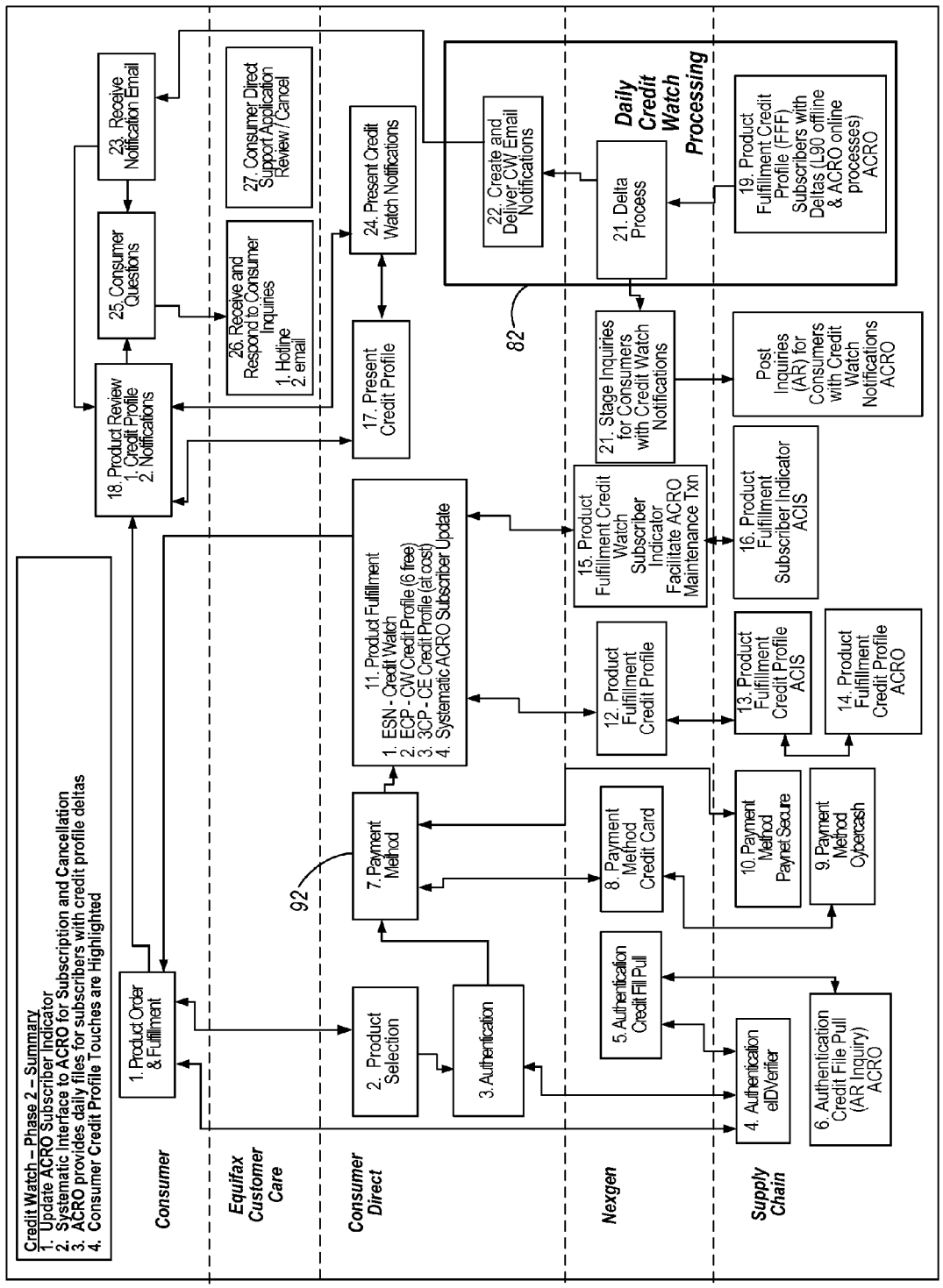
FIGS. 13-14 illustrate yet another embodiment and interactions between processes and their details for this embodiment.
Figure 14:
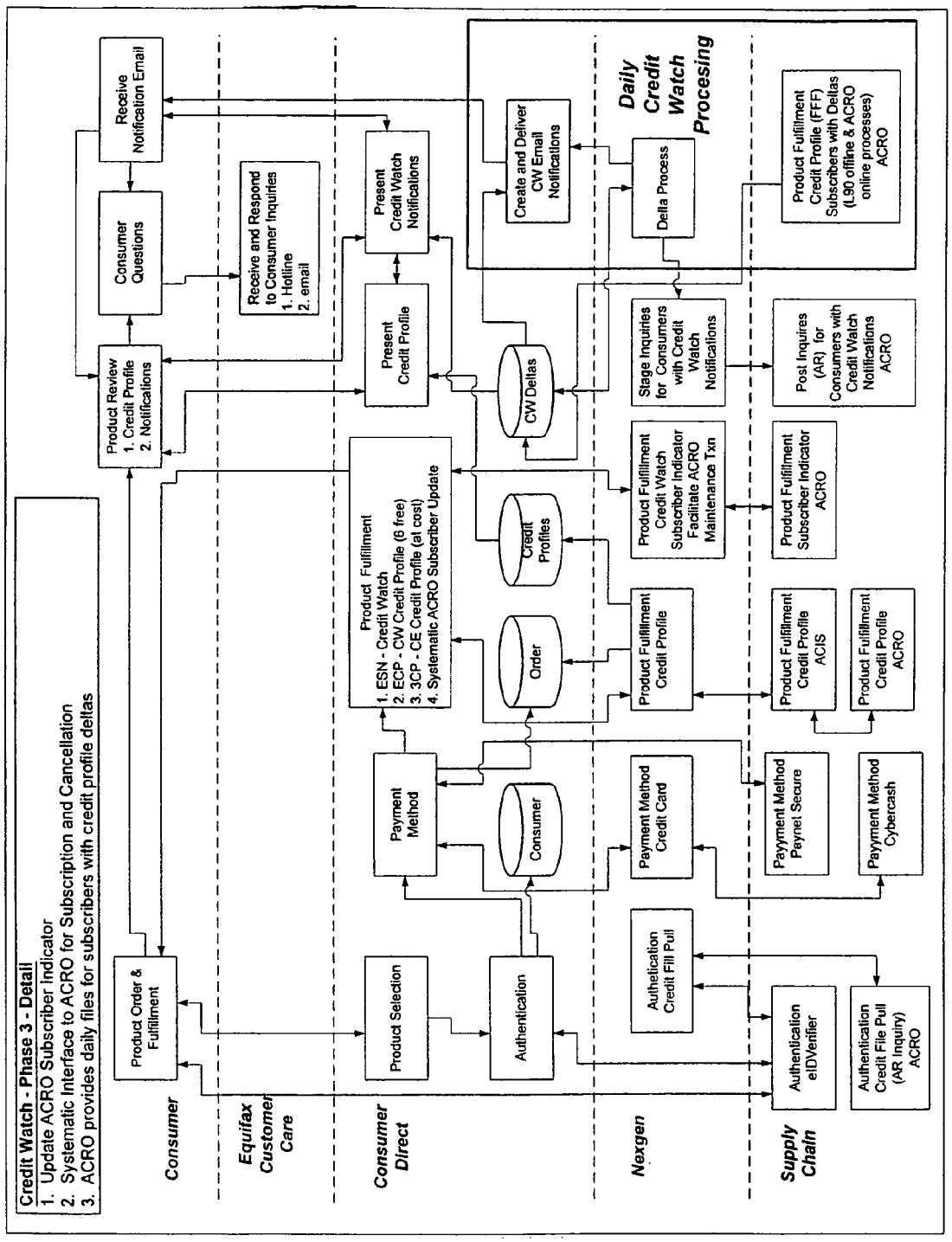

FIGS. 13-14 illustrate respectively the interactions between processes for an alternate embodiment and the interactions between the processes and one set of databases. In this embodiment, the Product Fulfillment process 92 is responsible for providing updates to the credit reporting online system (ACRO). One skilled in the art can readily appreciate other features of this embodiment from FIGS. 13-14.

A credit change monitoring service according to the present invention can be offered to consumers in different ways. A preferred way to make this service available to consumers is through subscription.

Figure 15:
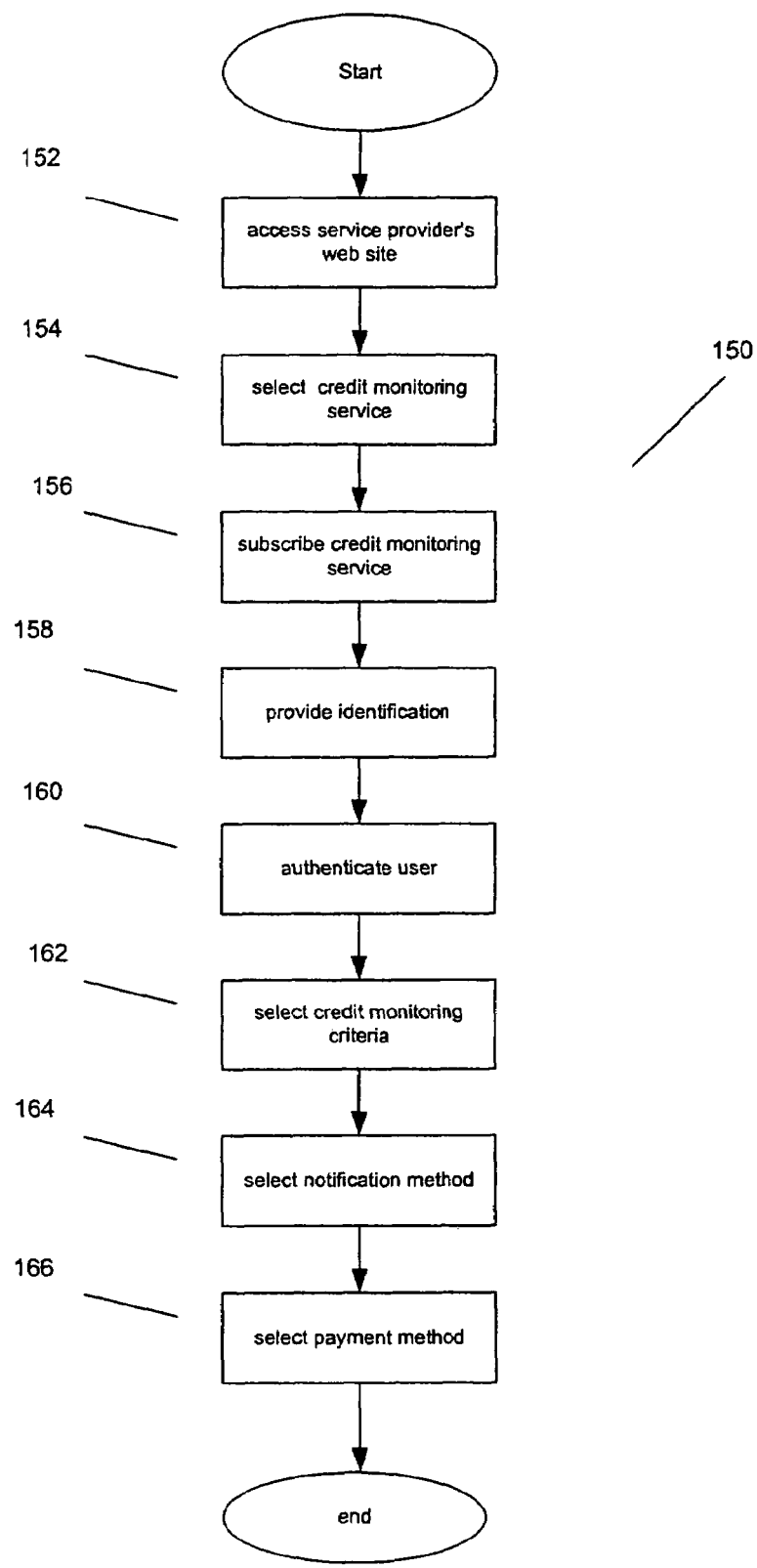
FIG. 15 depicts a subscription process.

FIG. 15 depicts a subscription process 150 for a credit file monitoring service according to the present invention. A user can sign-up for the credit file monitoring service in multiple ways. He can sign-up through a written application, which he mails in after filling it out. Also, he can sign-up for the monitoring service by calling the service provider's customer service representatives. A preferred way to sign-up for the service is by accessing the service provider's web site, step 152.

The service provider may offer many different services on its website, and the user has to select the credit file monitoring service, step 154. The user then proceeds to select the subscription of this monitoring service, step 156. The user must identify himself, step 158, by providing his personal information. The service provider may authenticate the user before accepting his subscription, step 160. The authentication may be through a multi-stage authentication process, where the service provider asks some questions regarding the user's credit history and the user has to answer them correctly. This multi-stage authentication process may be done through multiple choice questions. If the user fails to answer the questions correctly, he can still subscribe to the service by mailing in his personal identification information such as a copy of his social security card, a copy of a utility bill showing his address, etc.

After the service provider authenticates the user, the user can select credit data elements, such as credit data or a credit score, that he wants to monitor, step 162. He can choose one or multiple credit data elements, such as credit data or a credit score, for monitoring. The amount of data or credit score criteria he chooses to monitor may affect his subscription price.

Also, the user needs to select a method of communication, step 164. The service provider uses this method to communicate with him when credit file data changes. He can select one or more methods of communication (i.e., he can choose to receive an e-mail or a paging message, or both e-mail and paging message), when a financial institution reports a change to his credit file. The user may also select frequency of communication. He can choose to be notified as soon as a change occurs in his credit file or be notified periodically. He may choose even to be notified when he is ready to receive any communication, i.e., the service provider will notify him when he makes an inquiry. The method and timing of communication and the number of destination may also affect the subscription price.

Finally, the user selects a method of payment, step 166. The service provider can bill him monthly, annually, or per use basis. The service provider may demand prepayment for its service, i.e., the service provider will accept monthly or annual payments before the service is provided for that period. The service may also bill the user on per use basis, i.e., each time there is a change, the user will be notified, and the user has to pay before being able to check the change.

Figure 16:
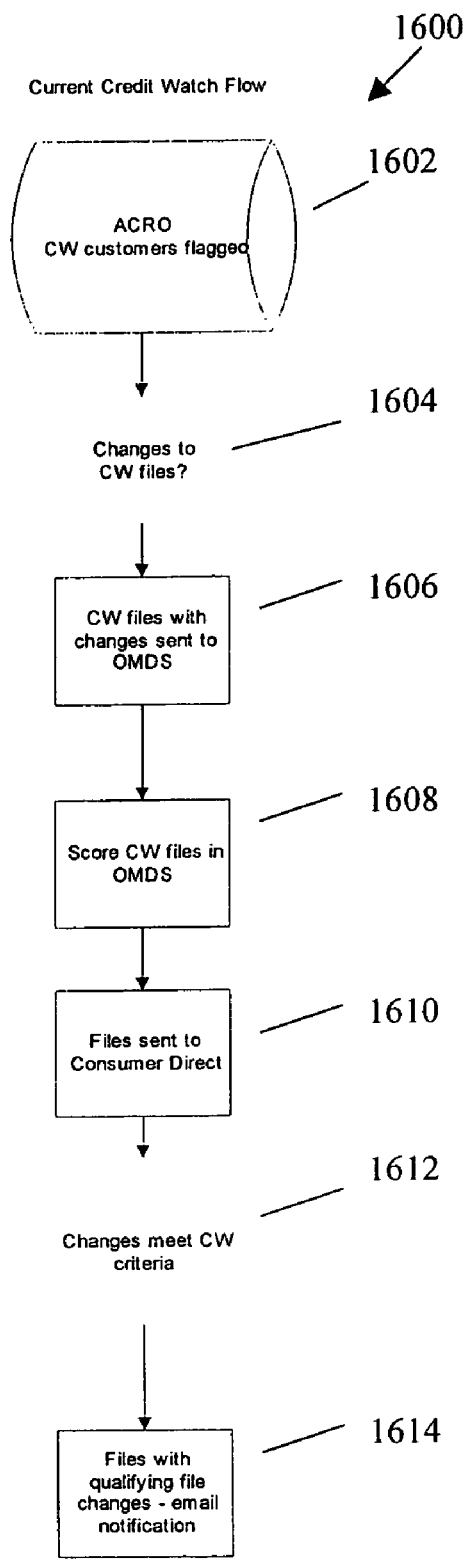
FIG. 16 illustrates yet another flow chart for a system monitoring process according to one embodiment of the present invention.
Figure 17:
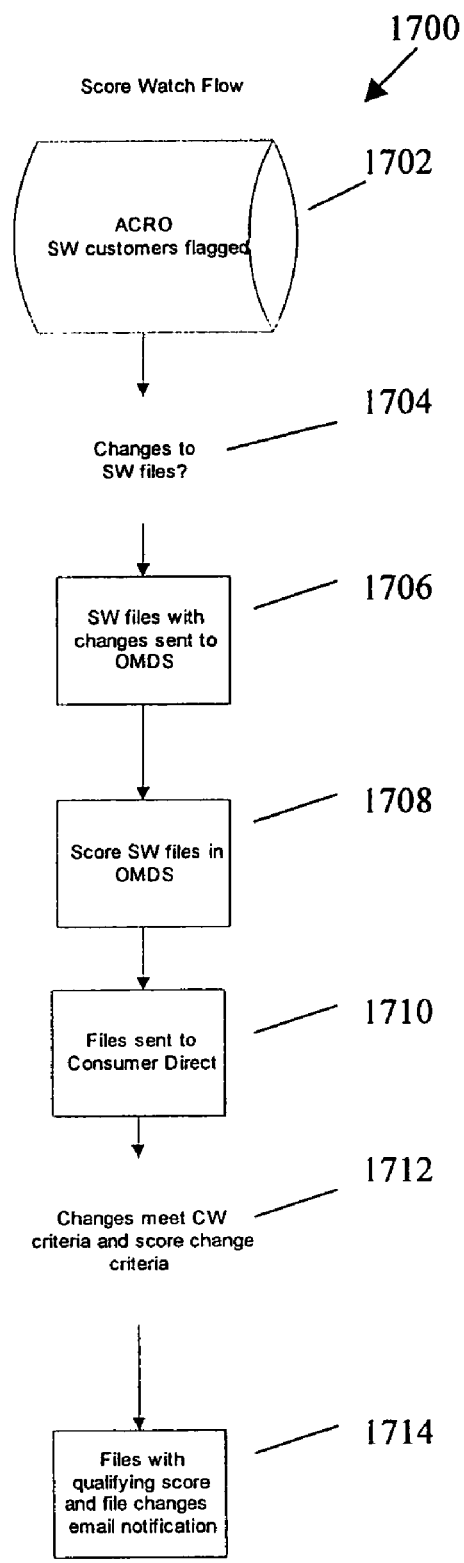
FIG. 17 illustrates another flow chart for a system monitoring process according to one embodiment of the present invention.

FIGS. 16 and 17 illustrate credit monitoring processes in accordance with embodiments of the present invention. The processes 1600 and 1700 can be implemented with a system such as the system 10 illustrated in FIG. 1.

In one embodiment of the invention, a credit score monitoring process 1600 begins at block 1602. At block 1602, credit files associated with credit score monitoring customers are flagged. In the embodiment shown in FIG. 16, credit files associated with a customers participating in a credit watch monitoring service can be flagged. For example, when a customer joins or otherwise participates in a credit watch monitoring service, a credit file associated with the customer can be designated with a flag indicating the customer desires monitoring of at least one credit data element associated with the credit file. The credit file can be stored in a credit reporting database such as ACRO.

Block 1602 is followed by decision block 1604, in which a determination is made whether a change to at least one monitored credit file is detected. In the embodiment shown in FIG. 16, a monitoring module such as 38 in FIG. 2 can detect when a change to a credit data element in the monitored credit file occurs. In one embodiment, such changes can be detected in real time, or as soon as the change occurs.

Decision block 1604 is followed by block 1606, in which monitored files with changes are transmitted to a order management data system (OMDS). In the embodiment shown in FIG. 16, an OMDS can be a data storage device or database, such as 46 in FIG. 2, which can receive any monitored files with changes to credit data elements.

Block 1606 is followed by block 1608, in which a score is determined for each of the monitored files with changes to the credit data elements. In the embodiment shown in FIG. 16, the database 46 can facilitate determining a score or rating for each monitored file with at least one changes to a credit data element. The database 46 can operate in conjunction with an associated processor, routine, or algorithm to determine a score or rating indicative of the magnitude of or significance of the change to the credit data element. The score or rating can be stored as an additional credit data element with the respective monitored file. Examples of a monitoring process to determine a change are described above in greater detail with respect to FIG. 4.

Block 1608 is followed by block 1610, in which the monitored files are transmitted to Consumer Direct for processing. In the embodiment shown in FIG. 16, an associated processor can receive and process the scores or ratings of the monitored files. An example of a process flow associated with Consumer Direct is shown in FIGS. 8-14.

Block 1610 is followed by decision block 1612, in which a determination is made whether any changes to the monitored files meet credit watch criteria. In the embodiment shown in FIG. 16, a monitoring module, such as 38 in FIG. 2, or a processor can compare the score or rating to a predetermined credit watch criteria to determine whether a customer should be alerted to a change in the monitored file. If a score or rating meets or exceeds a predetermined credit watch criteria, then the change associated with the credit data element is a qualifying change, and a determination is made to notify a customer associated with the particular monitored file. If a score or rating does not meet or exceed a predetermined credit watch criteria, then the change associated with the credit data element is not a qualifying change, and a determination is made not to notify a customer associated with the particular monitored file.

Decision block 1614 is followed by block 1616, in which a notification is transmitted to a customer associated with each monitored file with a qualifying change. In the embodiment shown in FIG. 16, a generation module such as 40 in FIG. 2 can generate a suitable notification for a customer associated with the monitored file with a qualifying change. The generation module can operate in conjunction with a communication module, such as 30 in FIG. 2, to facilitate communication with a customer, such as by posting data on a webpage on a website, sending an e-mail, placing a telephone call, sending a facsimile, or sending a paging message.

The method 1600 ends at block 1616.

FIG. 17 illustrates another credit monitoring process in accordance with another embodiment of the present invention. In this embodiment, a credit score monitoring process 1700 begins at block 1702.

At block 1702, credit files associated with credit score monitoring customers are flagged. In the embodiment shown in FIG. 17, credit files associated with a customers participating in a credit watch monitoring service can be flagged. For example, when a customer joins or otherwise participates in a credit score monitoring service, a credit file associated with the customer can be designated with a flag indicating the customer desires monitoring of at least one credit data element associated with the credit file. The credit file can be stored in a credit reporting database such as ACRO.

Block 1702 is followed by decision block 1704, in which a determination is made whether a change to at least one monitored credit file is detected. In the embodiment shown in FIG. 17, a monitoring module such as 38 in FIG. 2 can detect when a change to a credit score data element in the monitored credit file occurs. For example, a credit score in a credit file from a database such as ACRO can be compared to a credit score in an initial "compare" file generated when a customer joins or otherwise participates in a credit score monitoring service. In one embodiment, changes to a credit score or credit file can be detected in real time, or as soon as the change occurs.

Decision block 1704 is followed by block 1706, in which monitored files with changes are transmitted to a order management data system (OMDS). In the embodiment shown in FIG. 17, an OMDS can be a data storage device or database, such as 46 in FIG. 2, which can receive any monitored files with changes to credit score data elements.

Block 1706 is followed by block 1708, in which a score is determined for each of the monitored files with changes to the credit score data elements. In the embodiment shown in FIG. 17, the database 46 can facilitate determining a score or rating for each monitored file with at least one changes to a credit score data element. The database 46 can operate in conjunction with an associated processor, routine, or algorithm to determine a score or rating indicative of the magnitude of or significance of the change to the credit score data element. The score or rating can be stored as an additional credit score data element with the respective monitored file. Examples of a monitoring process to determine a change are described above in greater detail with respect to FIG. 4.

Block 1708 is followed by block 1710, in which the monitored files are transmitted to Consumer Direct for processing. In the embodiment shown in FIG. 17, an associated processor can receive and process the scores or ratings of the monitored files. An example of a process flow associated with Consumer Direct is shown in FIGS. 8-14.

Block 1710 is followed by decision block 1712, in which a determination is made whether any changes to the monitored files meet credit score watch criteria. In the embodiment shown in FIG. 17, a monitoring module, such as 38 in FIG. 2, or a processor can compare the score or rating to a predetermined credit score watch criteria to determine whether a customer should be alerted to a change in the monitored file. If a score or rating meets or exceeds a predetermined credit score watch criteria, then the change associated with the credit score data element is a qualifying change, and a determination is made to notify a customer associated with the particular monitored file. If a score or rating does not meet or exceed a predetermined credit score watch criteria, then the change associated with the credit score data element is not a qualifying change, and a determination is made not to notify a customer associated with the particular monitored file.

Decision block 1714 is followed by block 1716, in which a notification is transmitted to a customer associated with each monitored file with a qualifying change. In the embodiment shown in FIG. 17, a generation module such as 40 in FIG. 2 can generate a suitable notification for a customer associated with the monitored file with a qualifying change. The generation module can operate in conjunction with a communication module, such as 30 in FIG. 2, to facilitate communication with a customer, such as by posting data on a webpage on a website, sending an e-mail, placing a telephone call, sending a facsimile, or sending a paging message.

The method 1700 ends at block 1716.

Figure 18:
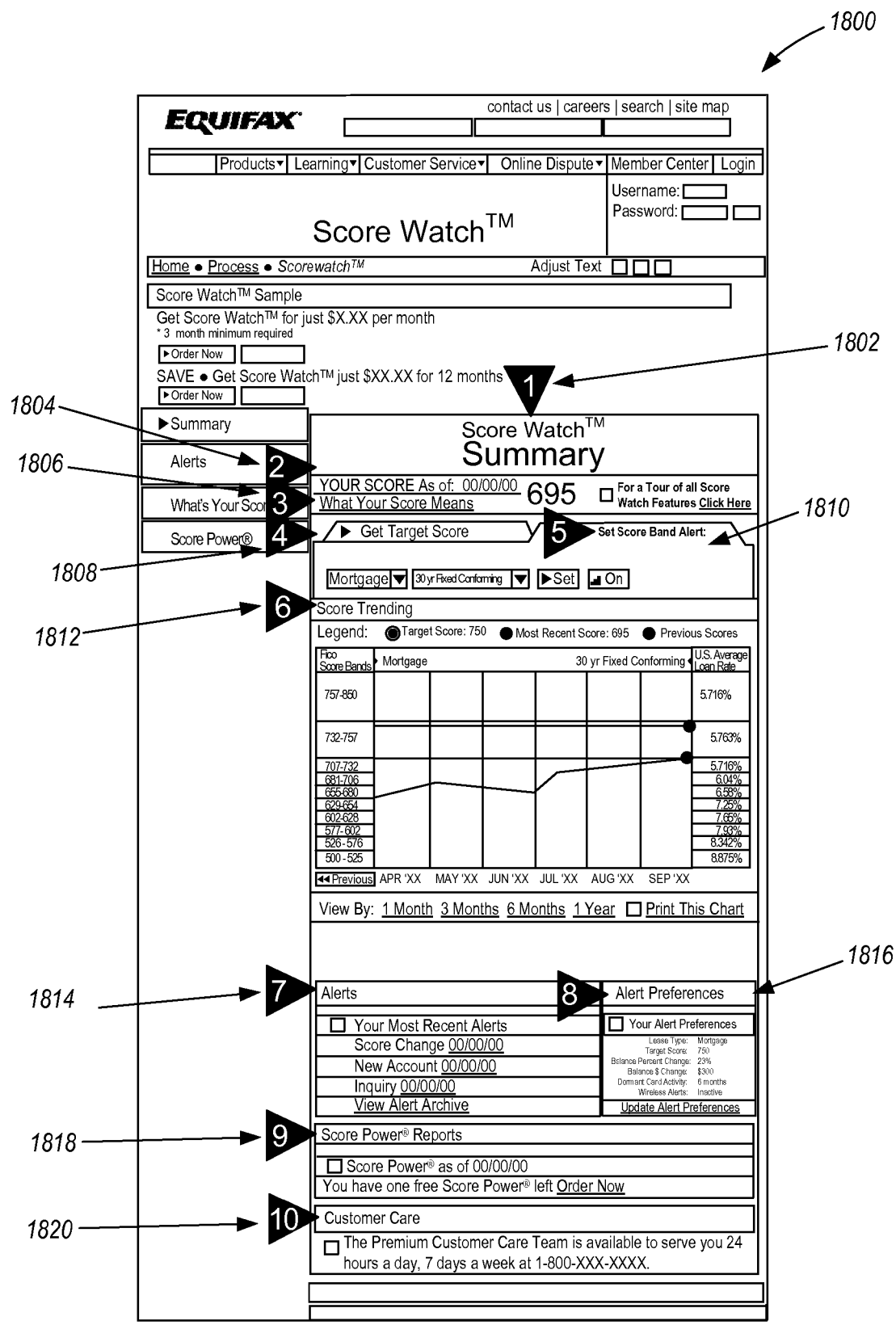
FIG. 18 illustrates a user interface according to one embodiment of the present invention.

FIG. 18 illustrates an example of a user interface for a credit monitoring process in accordance with an embodiment of the present invention. A user interface 1800 can provide a customer or user with information associated with a change to the user's credit score or rating. In the embodiment shown in FIG. 18, the user interface 1800 can include a summary 1802, a credit score 1804, a score explanation 1806, a target score 1808, a score band alert 1810, a score trend 1812, a display of alerts 1814, alert preferences 1816, a link to a score report 1818, and a link to customer service 1820. Some or all of the information, displays, links, and interfaces shown in FIG. 18 can be utilized for a user interface in accordance with other embodiments of the invention.

A summary 1802 can be a credit score summary such as a brief reason why a credit score changed. A summary 1802 can include a "bottom line" of what a score means, such as "Your score is slightly below the average score of U.S. consumers, though most lenders consider this a good score." Other examples of a summary can include, but are not limited to, "You have a good score and a wide array of loans and credit products will be available to you.", "Most lenders will consider offering you very competitive rates and terms on loan products.", and "Some lenders may require additional information, such as income or time at job, to help them more accurately set the terms of your loan product."

A credit score 1804 can be a score or rating determined based in part on at least credit data or information from at least one credit reporting database. A credit score 1804 can be any relative measurement of the credit worthiness or credit risk associated with a user, entity, or consumer. A credit score can be a number, a character, a series of numbers and/or characters, a measurement, or any combination thereof. In another embodiment, a rating can be a credit score based in part on at least one or more data elements in a database such as a credit reporting database. Examples of a credit score or rating can include, but are not limited to, FICO® or Fair, Isaac score, or scores or ratings determined by financial institutions and credit reporting agencies such as Equifax, TransUnion, and Experian.

A score explanation 1806 can include, but is not limited to, an updated credit score, a statement of a scale for the score, a statement of what the credit score means to lenders or other financial institutions, and tips on how to manage the credit score over time to improve the user's ability to obtain better interest rates or prices for a financial product. In one embodiment, one or more statements can be provided by a credit score provider and an appropriate statement can be selected by a communication module, such as 30 in FIG. 2, depending on a particular change to a user's credit score.

A target score 1808 can include a user input window, such as a text window, a pull down menu, or a radio button, adapted to receive a user selected credit score. A user can operate a keyboard, mouse, or other input device associated with a client or computer to enter a selected credit score as a target score. When a user enters a target score, the target score can be transmitted to an associated processor, such as server 12 in FIG. 1, for monitoring the user's credit score against the target score.

A score band alert 1810 can include at least one user input window, such as a text window, a pull down menu, or a radio button, adapted to receive a user selected input for a financial product or instrument of interest. A user can operate a keyboard, mouse, or other input device associated with a client or computer to enter a selected financial product or instrument of interest. When a user enters a financial product or instrument of interest, the financial product or instrument of interest can be transmitted to an associated processor, such as server 12 in FIG. 1, for monitoring the user's credit score against the selected financial product or instrument of interest. If for example, a user selects a 30 year home mortgage as a financial product of interest, the server 12 could then access or otherwise obtain financial information stored in any number of data storage devices or databases via the network 14. The server 12 may, for example, obtain current interest rates for 30 year home mortgages from databases or websites associated with national and local lending institutions. Based on the user's credit score, the server 12 or another processor can determine what interest rate the user would likely receive. When needed, the financial information, including the interest rate the user would likely receive, can be transmitted for display on the user interface 1800 or via other output or display means selected by the user.

A score trend 1812 can provide a graphical user interface, such as a graph or chart, for displaying likely rates or prices a user would receive based on trends in the user's credit score. For example, a graph showing different ranges or bands of credit scores and interest rates for a 30 year home mortgage can be plotted against changes in a user's credit score over a predetermined period of time, such as a six month period of time. In one example, a credit score range or band of 680-709 can be displayed against a 30 year home mortgage interest rate of 5.82%, while a user's particular current credit score of 695 can be displayed in the range or band of 680-709 corresponding with the interest rate of 5.82%. Any set of credit score ranges or bands can be preselected by an entity associated with a financial product, by a credit reporting agency, or other entity. In one embodiment, ranges or bands of credit scores can be based at least in part on average credit scores for consumers who have obtained specific interest rates for a particular financial product. Other graphical user interfaces, graphs, financial products or instruments, ranges or bands of credit scores, interest rates or prices, and periods of time can be utilized with a score trend in accordance with other embodiments of the invention.

A display of alerts 1814 can provide a description and listing of each credit file and credit score change alert or notification generated for a user. A description of an alert or notification can be, for example, "Score Change," "New Account," or "Inquiry." The display of alerts 1814 can include, but is not limited to, a date of the alert or notification, and a link to a webpage with detailed information associated with a particular alert or notification. When an alert or notification for a user is generated by the generation module, such as 40 in FIG. 2, the display of alerts 1814 can be updated with the alert or notification, including the date of the alert or notification, and a link to a webpage with detailed information associated with the alert or notification. In the embodiment shown in FIG. 18, a link to an alert archive can provide additional details for a particular alert or notification. The link to the alert archive can facilitate the display or output of additional information or webpages describing the particular alert or notification.

Alert preferences 1816 can provide a summary of alert or notification preferences for a particular user. The alert preferences can include, but are not limited to, loan type, target score, score band range, interest rate percent change, and overall activity. Other alert preferences can exist in accordance with other embodiments of the invention. In the embodiment shown in FIG. 18, a link to update alert preferences can provide a user interface to permit a user to add, delete, or otherwise modify an alert preference. Some or all of the user-selected alert preferences can be transmitted to the monitoring module, such as 38 in FIG. 2, and utilized for monitoring a credit score and credit data in a credit file.

A link to a score report 1818 can be provide additional credit file or credit score information to a user. In one embodiment, a link to a Score Power® report can be provided. Other links to other types of reports can be provided.

A link to customer service 1820 can provide assistance to a user. In one embodiment, the link can provide a telephone number, or an email or instant messaging window for a user to interface with a customer service representative.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

The claimed invention is:

1. A system for monitoring modifications to a credit score comprising a plurality of elements in a credit reporting database, the system comprising:
    at least one computer program stored on a computer-readable memory, the computer program for continuously monitoring at least part of a plurality of credit-related elements for a modification to at least one of the plurality of credit-related elements,
    wherein the modification to at least one of the plurality of credit-related elements comprises at least one of the plurality of credit-related elements modified by a datum collected from at least one financial entity, the datum comprising information associated with the individual; and
    at least one server for generating an updated credit score for an individual using the plurality of credit-related elements after at least one of the plurality of credit-related elements is modified by the datum collected from at least one financial entity, the credit score for the individual and the plurality of credit-related elements being stored on the computer-readable memory;
    wherein the system is capable of sending a notification that the credit score is updated to the individual substantially contemporaneously when the updated credit score for the individual is generated; and
    wherein the system is capable of sending the notification to more than one destination specified by the individual.

2. The system of claim 1, wherein the updated credit score for the individual comprises at least one of the following: a credit rating, a Fair Isaac score, a FICO score, a credit ranking, or a rating of the individual's creditworthiness.

3. The system of claim 1, wherein the system further comprises an e-mail server for sending the notification to the individual.

4. The system of claim 1, wherein the system is further capable of determining whether the updated credit score for the individual affects a rate associated with a financial product, and sending a notification to the individual if the rate is affected.

5. The system of claim 4, wherein the financial product comprises at least one of the following: home mortgage, auto loan, home equity loan, debt instrument, credit card, and a line of credit.

6. The system of claim 1, wherein at least part of the plurality of credit-related elements correspond to at least one of: a bankruptcy indicator or a tax lien indicator.

7. A system comprising:
    a database for:
        storing a plurality of credit-related elements on a computer-readable memory, the plurality of credit-related elements being associated with an individual and modifiable by a datum collected from at least one financial entity, the datum comprising information associated with the individual; and
        facilitating generation of a credit score for the individual using the plurality of credit-related elements after at least one of the plurality of credit-related elements is modified by the datum collected from at least one financial entity;
    a server processor; and
    a memory stored thereon comprising:
        a monitoring module for continuously monitoring for a change to the credit score for the individual;
        a generation module for generating a notification to the individual substantially contemporaneously to the change to the credit score for the individual, the notification comprising an identification of the change to the credit score for the individual and an identification of at least one financial product for which the individual is eligible based on the change to the credit score for the individual; and
        a communication module for:
            generating a secure message that includes content of the notification by encrypting the notification; and
            transmitting the secure message to the individual,
        wherein the communication module is capable of sending the notification to more than one destination specified by the individual.

8. The system of claim 7, wherein the identification of at least one financial product for which the individual is eligible based on the change to the credit score comprises an identification of a home mortgage and a mortgage rate associated with the home mortgage.

9. The system of claim 7, wherein the change to the credit score for the individual comprises the credit score for the individual is below a threshold selected by the individual.

10. The system of claim 7, wherein the change to the credit score for the individual meets or exceeds pre-selected credit score criteria.

11. The system of claim 7, wherein the notification comprises an identification of the datum collected from at least one financial entity.

\* \* \* \* \*